(12) United States Patent
Kobayashi et al.

(10) Patent No.: US 10,735,662 B2
(45) Date of Patent: Aug. 4, 2020

(54) IMAGING CONTROL DEVICE, IMAGING APPARATUS, IMAGING CONTROL METHOD, AND IMAGING CONTROL PROGRAM

(71) Applicant: FUJIFILM Corporation, Tokyo (JP)

(72) Inventors: Makoto Kobayashi, Saitama (JP); Ryo Hasegawa, Saitama (JP); Hitoshi Sakurabu, Saitama (JP); Tomonori Masuda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/813,764

(22) Filed: Mar. 10, 2020

(65) Prior Publication Data

US 2020/0213500 A1   Jul. 2, 2020

Related U.S. Application Data

(63) Continuation of application No. PCT/JP2018/026407, filed on Jul. 12, 2018.

(30) Foreign Application Priority Data

Sep. 15, 2017 (JP) .................................. 2017-177988

(51) Int. Cl.
   *H04N 5/235* (2006.01)
(52) U.S. Cl.
   CPC ................................. *H04N 5/2352* (2013.01)
(58) Field of Classification Search
   CPC ....... H04N 5/21; H04N 5/2357; H04N 5/2352
   See application file for complete search history.

(56) References Cited

U.S. PATENT DOCUMENTS 8,289,441 B2  10/2012  Matsuura et al.
9,423,601 B2   8/2016  Toda et al.
(Continued)

FOREIGN PATENT DOCUMENTS

JP   2007318581   12/2007
JP   2008042471    2/2008
(Continued)

OTHER PUBLICATIONS

"International Search Report (Form PCT/ISA/210) of PCT/JP2018/026407," dated Sep. 25, 2018, with English translation thereof, pp. 1-4.
(Continued)

*Primary Examiner* — Lin Ye
*Assistant Examiner* — Tuan H Le
(74) *Attorney, Agent, or Firm* — JCIPRNET

(57) ABSTRACT

A digital camera includes an imaging control unit that images a subject by performing driving based on a rolling shutter method on an imaging sensor, and a light emission control unit that emits auxiliary light a plurality of times from a light emission device while the imaging is performed. A difference Δt between start timings of exposure started by the driving in two adjacent pixel rows is a value other than 1/n (n is an integer greater than or equal to 1) of an exposure time in which the exposure is performed. The light emission control unit controls a light emission cycle of the auxiliary light to be a time that is m (m is an integer greater than or equal to 1) times the difference.

20 Claims, 15 Drawing Sheets

(56) References Cited

U.S. PATENT DOCUMENTS

| | | |
|---|---|---|
| 10,142,566 B2 | 11/2018 | Toda et al. |
| 10,362,245 B2 | 7/2019 | Toda et al. |
| 10,602,087 B2 | 3/2020 | Toda et al. |
| 2007/0230939 A1* | 10/2007 | Tanaka .................. H04N 5/2353 396/155 |
| 2008/0024633 A1* | 1/2008 | Hofer ..................... H04N 5/235 348/296 |
| 2009/0148148 A1 | 6/2009 | Tanaka |
| 2010/0026853 A1 | 2/2010 | Mokhnatyuk |
| 2011/0255786 A1* | 10/2011 | Hunter ..................... H04N 5/21 382/190 |
| 2014/0364690 A1* | 12/2014 | Seto ...................... A61B 1/0005 600/109 |
| 2014/0371535 A1* | 12/2014 | Seto ...................... A61B 1/0661 600/160 |
| 2015/0116561 A1* | 4/2015 | Takei ................. A61B 1/00009 348/296 |
| 2016/0073865 A1* | 3/2016 | Takahashi .......... G02B 23/2461 600/301 |
| 2016/0105597 A1* | 4/2016 | Ke ....................... H04N 5/3765 348/362 |

FOREIGN PATENT DOCUMENTS

| | | |
|---|---|---|
| JP | 2009139553 | 6/2009 |
| JP | 2011015222 | 1/2011 |
| JP | 2014150412 | 8/2014 |
| WO | 2016105775 | 6/2016 |

OTHER PUBLICATIONS

"Written Opinion of the International Searching Authority (Form PCT/ISA/237) of PCT/JP2018/026407," dated Sep. 25, 2018, with English translation thereof, pp. 1-8.

* cited by examiner

_US 10,735,662 B2_

IMAGING CONTROL DEVICE, IMAGING APPARATUS, IMAGING CONTROL METHOD, AND IMAGING CONTROL PROGRAM

CROSS REFERENCE TO RELATED APPLICATIONS

This application is a Continuation of PCT International Application No. PCT/JP2018/026407 filed on Jul. 12, 2018, which claims priority under 35 U.S.C § 119(a) to Patent Application No. 2017-177988 filed in Japan on Sep. 15, 2017, all of which are hereby expressly incorporated by reference into the present application.

BACKGROUND OF THE INVENTION

1. Field of the Invention

The present invention relates to an imaging control device, an imaging apparatus, an imaging control method, and a non-transitory computer readable recording medium storing a imaging control program.

2. Description of the Related Art

In recent years, there has been an increased demand for an electronic apparatus having an imaging function such as a digital still camera, a digital video camera, or a camera-equipped mobile phone (for example, a smartphone) along with an increase in resolution of an imaging sensor such as a charge coupled device (CCD) image sensor or a complementary metal oxide semiconductor (CMOS) image sensor. The electronic apparatus having the imaging function is referred to as an imaging apparatus.

Driving based on a rolling shutter method is known as a method of driving a MOS type imaging sensor mounted in the imaging apparatus.

The driving based on the rolling shutter method is a method of sequentially performing driving of starting exposure of a pixel row by resetting each photoelectric conversion element of the pixel row of the imaging sensor and then, reading out a pixel signal corresponding to charges accumulated in each photoelectric conversion element of the pixel row into a signal line while changing the pixel row.

JP2009-139553A discloses an imaging apparatus that emits auxiliary light a plurality of times with a cycle of 1/n (n is an integer greater than or equal to 1) of an exposure time of each pixel row in a case where a subject is imaged by performing the driving based on the rolling shutter method.

SUMMARY OF THE INVENTION

In the driving based on the rolling shutter method, since the pixel signal is read out for each pixel row, it is necessary that a reading process for the pixel signal from each pixel row does not overlap with a reading process for the pixel signal of another pixel row. Thus, a difference in exposure start timing (or exposure end timing) between adjacent pixel rows needs to be a time greater than or equal to a time (hereinafter, referred to as a reading process time) necessary for the reading process.

In a case where the exposure time is longer than the reading process time and the difference in exposure start timing is 1/n (n is an integer greater than or equal to 1) of the exposure time, the exposure of the n-th pixel row from a random pixel row is started during the reading process for the pixel signal from the random pixel row.

The exposure of the pixels is started by resetting the charges accumulated in the photoelectric conversion element. In a case where a reset operation for another pixel is performed during the reading process for the pixel signal from a certain pixel, there is a concern such that a noise is mixed into the pixel signal.

Thus, generally, the difference in exposure start timing is set such that the exposure of another pixel row is not started during the reading process for the pixel signal from a certain pixel row.

Specifically, in a case where the exposure time is longer than the reading process time, the difference in exposure start timing is set to a value other than 1/n of the exposure time.

FIG. 15 is a timing chart illustrating one example of the driving based on the rolling shutter method. A horizontal axis in FIG. 15 denotes time. Pixel rows L1 to L5 of the imaging sensor as a drive target are shown in a vertical direction in FIG. 15.

FIG. 15 illustrates an example in which in a case where a unit time is denoted by "T" in FIG. 15, the exposure time of each pixel row is 12T, the difference in exposure start timing between the adjacent pixel rows is 5T, and the reading process time is 3T.

According to the example illustrated in FIG. 15, in any of the pixel rows L1 to L5, the exposure of another pixel row is not started during the reading process for the pixel signal.

Meanwhile, in a case where the exposure time is shorter than the reading process time, the difference in exposure start timing is set to be greater than or equal to a total value of the exposure time and the reading process time such that the exposure of another pixel row is not started during the reading process for the pixel signal from a random pixel row.

FIG. 16 is a timing chart illustrating another example of the driving based on the rolling shutter method. A horizontal axis in FIG. 16 denotes time. The pixel rows L1 to L5 of the imaging sensor as a drive target are shown in a vertical direction in FIG. 16.

FIG. 16 illustrates an example in which in a case where a unit time is denoted by "T" in FIG. 16, the exposure time of each pixel row is 2T, the difference in exposure start timing between the adjacent pixel rows is 5T, and the reading process time is 3T.

According to the example illustrated in FIG. 16, in any of the pixel rows L1 to L5, the exposure of another pixel row is not started during the reading process for the pixel signal.

It is considered that in a state where the difference in exposure start timing between the pixel rows in the driving based on the rolling shutter method is set to satisfy the above condition, the auxiliary light is emitted a plurality of times with the cycle of 1/n of the exposure time as disclosed in JP2009-139553A.

In FIG. 15, a light emission timing of the auxiliary light in the case of n=2 is indicated by a white arrow. In FIG. 16, the light emission timing of the auxiliary light in the case of n=1 is indicated by a white arrow and a broken line white arrow.

The timing indicated by the white arrow and the broken line white arrow is a timing at which a light emission intensity of the auxiliary light is at a peak.

In a case where the auxiliary light is emitted with a cycle of ½ of the exposure time, in any of an exposure period of each of the pixel row L1 to the pixel row L5, a start timing or an end timing of the exposure period overlaps with the light emission timing of the auxiliary light as illustrated in FIG. 15. Thus, a light reception intensity of the auxiliary light in each pixel row is changed due to slight jitter in the auxiliary light, and brightness unevenness occurs in a captured image.

In addition, even in the example illustrated in FIG. 16, the light emission timing of the auxiliary light overlaps with the start timing and the end timing of the exposure period of each of the pixel rows L2 and L4. Thus, the light reception intensity of the auxiliary light in each pixel row is changed due to slight jitter in the auxiliary light, and brightness unevenness occurs in the captured image.

Furthermore, in the example illustrated in FIG. 16, as illustrated by a dotted line arrow, the auxiliary light may be emitted when exposure is not performed in any pixel row, and the auxiliary light is unnecessarily emitted.

The present invention is conceived in view of the above matter. An object of the present invention is to provide an imaging control device, an imaging apparatus, an imaging control method, and an imaging control program capable of preventing occurrence of brightness unevenness in a captured image and a decrease in efficiency of auxiliary light.

An imaging control device of the present invention comprises an imaging control unit that images a subject by performing driving based on a rolling shutter method on an imaging sensor which includes a plurality of pixels each including a photoelectric conversion element and an imaging surface on which a plurality of pixel rows each including a plurality of the pixels arranged in a first direction are arranged in a second direction orthogonal to the first direction, and a light emission control unit that emits auxiliary light a plurality of times from a light emission device of the auxiliary light while the imaging is performed, in which the driving based on the rolling shutter method is driving of sequentially performing a process of starting exposure of the photoelectric conversion elements of the pixel rows by resetting charges of the photoelectric conversion elements of the pixel rows while changing the pixel rows, and sequentially reading out pixel signals corresponding to charges accumulated in the photoelectric conversion elements from the pixel rows for which the exposure is ended, a difference between start timings of the exposure started by the driving in two adjacent pixel rows is a value other than 1/n of an exposure time that is a time in which the exposure is performed, where n is an integer greater than or equal to 1, and the light emission control unit controls a light emission cycle of the auxiliary light to be a time that is m times the difference, where m is an integer greater than or equal to 1.

An imaging apparatus of the present invention comprises the imaging control device, and the imaging sensor.

An imaging control method of the present invention comprises an imaging control step of imaging a subject by performing driving based on a rolling shutter method on an imaging sensor which includes a plurality of pixels each including a photoelectric conversion element and an imaging surface on which a plurality of pixel rows each including a plurality of the pixels arranged in a first direction are arranged in a second direction orthogonal to the first direction, and a light emission control step of emitting auxiliary light a plurality of times from a light emission device of the auxiliary light while the imaging is performed, in which the driving based on the rolling shutter method is driving of sequentially performing a process of starting exposure of the photoelectric conversion elements of the pixel rows by resetting charges of the photoelectric conversion elements of the pixel rows while changing the pixel rows, and sequentially reading out pixel signals corresponding to charges accumulated in the photoelectric conversion elements from the pixel rows for which the exposure is ended, a difference between start timings of the exposure started by the driving in two adjacent pixel rows is a value other than 1/n of an exposure time that is a time in which the exposure is performed, where n is an integer greater than or equal to 1, and in the light emission control step, a light emission cycle of the auxiliary light is controlled to be a time that is m times the difference, where m is an integer greater than or equal to 1.

A non-transitory computer recording medium storing a imaging control program of the present invention is an imaging control program causing a computer to execute an imaging control step of imaging a subject by performing driving based on a rolling shutter method on an imaging sensor which includes a plurality of pixels each including a photoelectric conversion element and an imaging surface on which a plurality of pixel rows each including a plurality of the pixels arranged in a first direction are arranged in a second direction orthogonal to the first direction, and a light emission control step of emitting auxiliary light a plurality of times from a light emission device of the auxiliary light while the imaging is performed, in which the driving based on the rolling shutter method is driving of sequentially performing a process of starting exposure of the photoelectric conversion elements of the pixel rows by resetting charges of the photoelectric conversion elements of the pixel rows while changing the pixel rows, and sequentially reading out pixel signals corresponding to charges accumulated in the photoelectric conversion elements from the pixel rows for which the exposure is ended, a difference between start timings of the exposure started by the driving in two adjacent pixel rows is a value other than 1/n of an exposure time that is a time in which the exposure is performed, where n is an integer greater than or equal to 1, and in the light emission control step, a light emission cycle of the auxiliary light is controlled to be a time that is m times the difference, where m is an integer greater than or equal to 1.

According to the present invention, an imaging control device, an imaging apparatus, an imaging control method, and an imaging control program capable of preventing occurrence of brightness unevenness in a captured image and a decrease in efficiency of auxiliary light can be provided.

DESCRIPTION OF THE PREFERRED EMBODIMENTS

Hereinafter, an embodiment of the present invention will be described with reference to the drawings.

Figure 1:
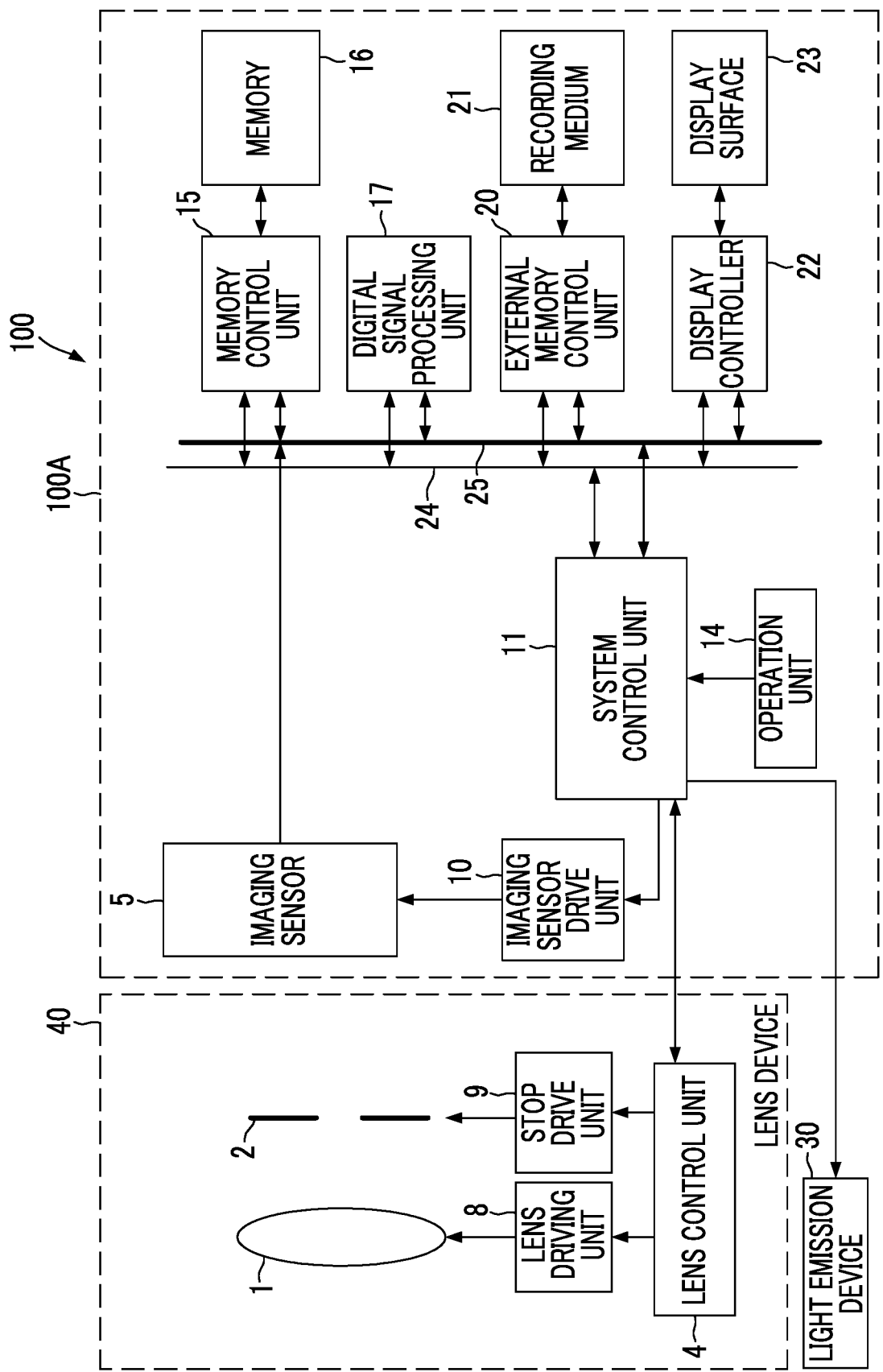
FIG. 1 is a diagram illustrating a schematic configuration of a digital camera 100 that is an imaging apparatus according to one embodiment of the present invention.

FIG. 1 is a diagram illustrating a schematic configuration of a digital camera 100 that is an imaging apparatus according to one embodiment of the present invention.

The digital camera 100 illustrated in FIG. 1 comprises a main body unit 100A; a lens device 40 that includes an imaging lens 1, a stop 2, a lens control unit 4, a lens drive unit 8, and a stop drive unit 9; and a light emission device (flash) 30.

Each of the lens device 40 and the light emission device 30 may be attachable and detachable with respect to the main body unit 100A or may be integrated with the main body unit 100A.

The imaging lens 1 includes a focus lens, a zoom lens, or the like that can be moved in an optical axis direction.

The lens control unit 4 of the lens device 40 is configured to be capable of communicating with a system control unit 11 of the main body unit 100A in a wired or wireless manner.

In accordance with an instruction from the system control unit 11, the lens control unit 4 changes the position of a principal point of the focus lens by controlling the focus lens included in the imaging lens 1 through the lens drive unit 8, changes the position (focal length) of the zoom lens by controlling the zoom lens included in the imaging lens 1 through the lens drive unit 8, or controls an F number of the stop 2 through the stop drive unit 9.

The light emission device 30 emits auxiliary light from a semiconductor light source or the like such as a xenon light source or a light emitting diode (LED). The light emission device 30 emits the auxiliary light based on an instruction from the system control unit 11 of the main body unit 100A.

The main body unit 100A comprises a MOS type imaging sensor 5 that images a subject through an imaging optical system including the imaging lens 1 and the stop 2.

The imaging sensor 5 includes an imaging surface on which a plurality of pixels are two-dimensionally arranged, converts a subject image formed on the imaging surface by the imaging optical system into pixel signals by the plurality of pixels, and outputs the pixel signals. Hereinafter, a set of pixel signals output from the pixels of the imaging sensor 5 will be referred to as a captured image signal.

The system control unit 11 that manages and controls the entire electric control system of the digital camera 100 drives the imaging sensor 5 through the imaging sensor drive unit 10 and outputs the subject image captured through the imaging optical system of the lens device 40 as the captured image signal.

The imaging sensor drive unit 10 drives the imaging sensor 5 by generating a drive signal based on an instruction from the system control unit 11 and supplying the drive signal to the imaging sensor 5. A hardware configuration of the imaging sensor drive unit 10 is an electric circuit configured by combining circuit elements such as semiconductor elements.

A command signal from a user is input into the system control unit 11 through an operation unit 14. The operation unit 14 includes a touch panel integrated with a display surface 23, described later, various buttons, and the like.

The system control unit 11 manages and controls the entire digital camera 100. A hardware structure of the system control unit 11 corresponds to various processors that perform processes by executing programs including an imaging control program.

The various processors include a central processing unit (CPU) that is a general-purpose processor performing various processes by executing a program, a programmable logic device (PLD) that is a processor of which a circuit configuration can be changed after manufacturing like a field programmable gate array (FPGA), or a dedicated electric circuit that is a processor having a circuit configuration dedicatedly designed to execute a specific process like an application specific integrated circuit (ASIC).

More specifically, a structure of the various processors is an electric circuit in which circuit elements such as semiconductor elements are combined.

The system control unit 11 may be configured with one of the various processors or may be configured with a combination of two or more processors of the same type or different types (for example, a combination of a plurality of FPGAs or a combination of a CPU and an FPGA).

Furthermore, the electric control system of the digital camera 100 comprises a memory 16 including a random access memory (RAM) and a read only memory (ROM), a memory control unit 15 that controls data recording in the memory 16 and data read from the memory 16, a digital signal processing unit 17 that generates captured image data in accordance with various formats such as Joint Photographic Experts Group (JPEG) format by performing digital signal processing on the captured image signal output from the imaging sensor 5, an external memory control unit 20 that controls data recording in a recording medium 21 and data read from the recording medium 21, the display surface 23 configured with an organic electroluminescence (EL) panel, a liquid crystal panel, or the like, and a display controller 22 that controls display on the display surface 23.

Programs executed by the system control unit 11 including the imaging control program are recorded in the ROM included in the memory 16.

The recording medium 21 is a semiconductor memory such as a flash memory incorporated in the digital camera 100, a portable semiconductor memory that is attachable and detachable with respect to the digital camera 100, or the like.

The memory control unit 15, the digital signal processing unit 17, the external memory control unit 20, and the display controller 22 are connected to each other through a control bus 24 and a data bus 25 and are controlled by instructions from the system control unit 11.

A hardware structure of the digital signal processing unit 17 corresponds to the above illustrated various processors that perform processes by executing programs.

The display controller 22 includes the above illustrated various processors that perform processes by executing programs, and a display memory for storing data of an image to be displayed on the display surface 23.

Figure 2:
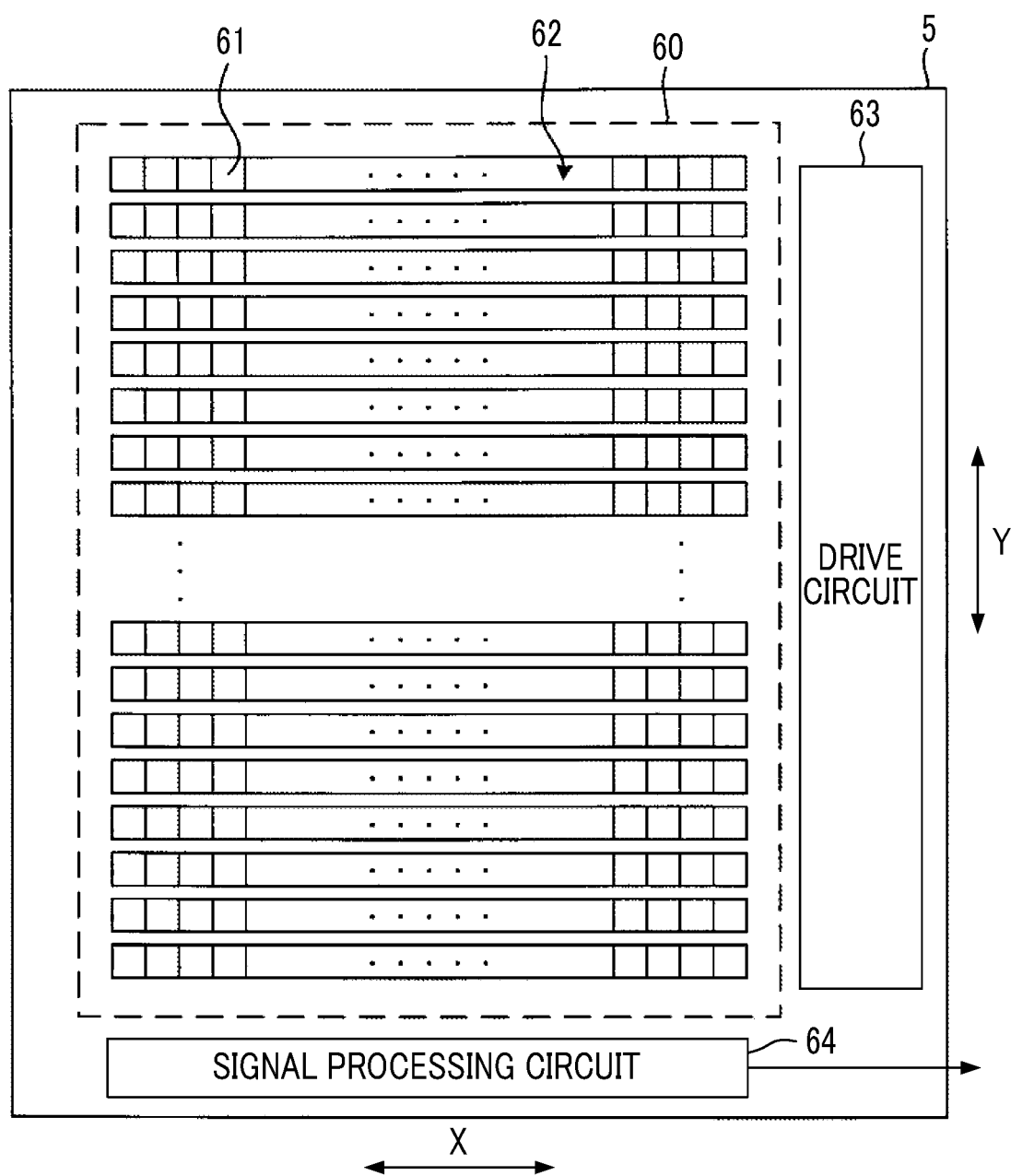
FIG. 2 is a schematic plan view illustrating a schematic configuration of an imaging sensor 5 illustrated in FIG. 1.

FIG. 2 is a schematic plan view illustrating a schematic configuration of the imaging sensor 5 illustrated in FIG. 1.

The imaging sensor 5 comprises an imaging surface 60 on which a plurality of pixel rows 62 each including a plurality of pixels 61 arranged in a row direction X that is a first direction are arranged in a column direction Y that is a second direction and is orthogonal to the row direction X, a drive circuit 63 that drives the pixels 61 arranged on the imaging surface 60, and a signal processing circuit 64 that processes a pixel signal read into a signal line from each pixel 61 of the pixel rows 62 arranged on the imaging surface 60.

Hereinafter, in FIG. 2, an end portion of the imaging surface 60 on one end side (an upper side in FIG. 2) of the column direction Y will be referred to as an upper end, and an end portion of the imaging surface 60 on the other end side (a lower side in FIG. 2) of the column direction Y will be referred to as a lower end.

Figure 3:
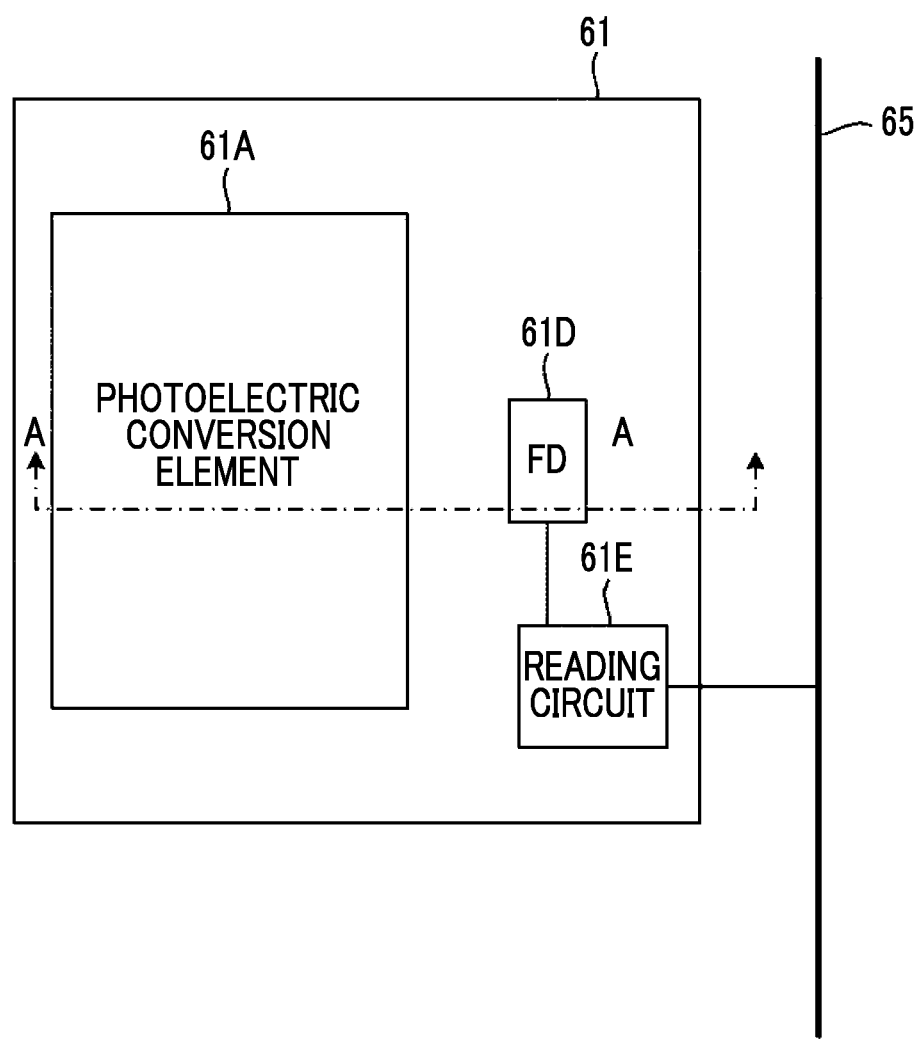
FIG. 3 is a schematic plan view illustrating a schematic configuration of a pixel 61 of the imaging sensor 5 illustrated in FIG. 2.

FIG. 3 is a schematic plan view illustrating a schematic configuration of the pixel 61 of the imaging sensor 5 illustrated in FIG. 2.

As illustrated in FIG. 3, the pixel 61 comprises a photoelectric conversion element 61A, a floating diffusion 61D, and a reading circuit 61E.

The photoelectric conversion element 61A receives light passing through the imaging optical system of the lens device 40 and generates and accumulates charges corresponding to a light reception intensity. For example, the photoelectric conversion element 61A is configured with a silicon photodiode formed in the semiconductor substrate.

The floating diffusion 61D converts charges into a voltage signal. The charges accumulated in the photoelectric conversion element 61A are transferred to the floating diffusion 61D.

The reading circuit 61E is a circuit that reads out the voltage signal corresponding to a potential of the floating diffusion 61D into a signal line 65 as a pixel signal. The reading circuit 61E is driven by the drive circuit 63 illustrated in FIG. 2. One signal line 65 is disposed for a pixel column that includes the pixels 61 at the same position in the column direction Y. The pixel signal read out into each signal line 65 is input into the signal processing circuit 64.

Figure 4:
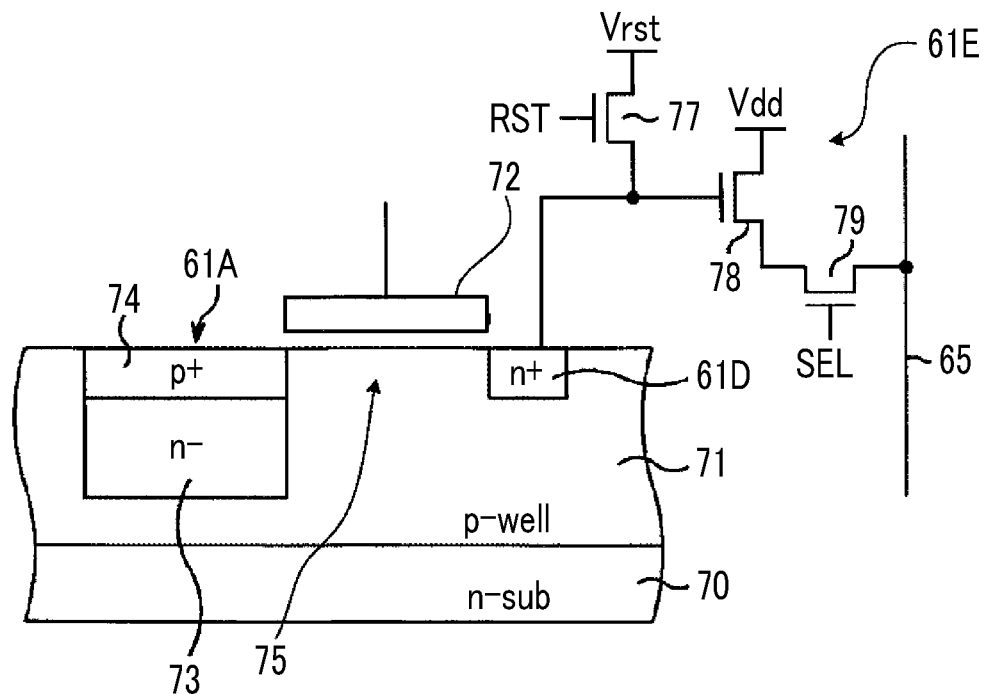
FIG. 4 is a schematic A-A cross sectional view of the pixel 61 illustrated in FIG. 3.

FIG. 4 is a schematic A-A cross sectional view of the pixel 61 illustrated in FIG. 3.

As illustrated in FIG. 4, a P-well layer 71 is formed on a surface of an N-type substrate 70, and the photoelectric conversion element 61A is formed on a surface portion of the P-well layer 71.

The photoelectric conversion element 61A is configured with an N-type impurity layer 73 and a P-type impurity layer 74 formed on the N-type impurity layer 73. The N-type substrate 70 and the P-well layer 71 constitute the semiconductor substrate.

On the surface portion of the P-well layer 71, the floating diffusion 61D that includes an N-type impurity layer is formed to be spaced from the photoelectric conversion element 61A.

A reading electrode 72 is formed above a region 75 of the P-well layer 71 between the photoelectric conversion element 61A and the floating diffusion 61D through an oxidation film, not illustrated.

By forming a channel in the region 75 between the photoelectric conversion element 61A and the floating diffusion 61D by controlling a potential of the reading electrode 72, the charges accumulated in the photoelectric conversion element 61A can be transferred to the floating diffusion 61D. The potential of the reading electrode 72 is controlled by the drive circuit 63 in FIG. 2.

In the example illustrated in FIG. 4, the reading circuit 61E is configured with a reset transistor 77 that resets the potential of the floating diffusion 61D, an output transistor 78 that converts the potential of the floating diffusion 61D into a pixel signal and outputs the pixel signal, and a selection transistor 79 for selectively reading out the pixel signal output from the output transistor 78 into the signal line 65. The configuration of the reading circuit is one example and is not for limitation purposes.

The reading circuit 61E may be shared by the plurality of pixels 61 arranged in the column direction Y.

While the photoelectric conversion element 61A is configured with a silicon photodiode, the photoelectric conversion element 61A may also be configured with a film of an organic or inorganic photoelectric conversion material formed above the semiconductor substrate and an impurity region formed in the semiconductor substrate for accumulating charges generated in the film. In this case, the charges accumulated in the impurity region are transferred to the floating diffusion 61D in FIG. 4.

The drive circuit 63 illustrated in FIG. 2 performs resetting of each photoelectric conversion element 61A included in the pixel row 62 (emission of the charges accumulated in the photoelectric conversion element 61A), reading of the pixel signal corresponding to the charges accumulated in each photoelectric conversion element 61A into the signal line 65, and the like by driving the reading electrode 72 and the reading circuit 61E of each pixel 61 independently for each pixel row 62. The drive circuit 63 is controlled by the imaging sensor drive unit 10.

The resetting of the photoelectric conversion element 61A is performed by resetting the floating diffusion 61D by the reset transistor 77 in a state where a channel is formed in the region 75 below the reading electrode 72.

The resetting of the photoelectric conversion element 61A may be configured to be performed by performing driving of separately providing a charge emission region adjacent to the photoelectric conversion element 61A and emitting the charges accumulated in the photoelectric conversion element 61A to the charge emission region by the drive circuit 63.

The signal processing circuit 64 illustrated in FIG. 2 performs correlative double sampling processing on the pixel signal read into the signal line 65 from each pixel 61 of the pixel row 62, converts the pixel signal after the correlative double sampling processing into a digital signal, and outputs the digital signal to the data bus 25. The signal processing circuit 64 is controlled by the imaging sensor drive unit 10.

The digital signal processing unit 17 generates the captured image data by performing signal processing such as a demosaicing process and gamma-correction processing on the pixel signal output to the data bus 25 from the imaging sensor 5.

Figure 5:
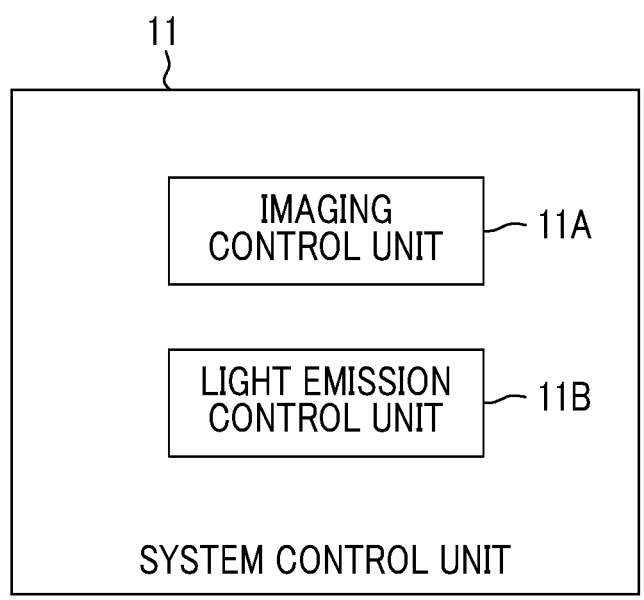
FIG. 5 is a function block diagram of a system control unit 11 in the digital camera 100 illustrated in FIG. 1.

FIG. 5 is a function block diagram of the system control unit 11 in the digital camera 100 illustrated in FIG. 1.

The digital camera 100 illustrated in FIG. 1 is equipped with a high speed synchronization mode as an imaging mode. The high speed synchronization mode is a mode in which during imaging of the subject by the imaging sensor 5, the imaging can be performed with sufficient brightness in a short exposure time by emitting the auxiliary light at a high speed from the light emission device 30 a plurality of times. Function blocks illustrated in FIG. 5 show function blocks of the system control unit 11 in a case where the high speed synchronization mode is set.

As illustrated in FIG. 5, by executing the programs recorded in the ROM of the memory 16 including the imaging control program, the system control unit 11 functions as an imaging control device that comprises an imaging control unit 11A and a light emission control unit 11B.

The imaging control unit 11A images the subject by controlling the imaging sensor drive unit 10 to drive the imaging sensor 5 based on a rolling shutter method.

The driving based on the rolling shutter method is driving of sequentially performing a process of starting exposure of the photoelectric conversion elements 61A by resetting the charges of the photoelectric conversion elements 61A of the pixel rows 62 while changing the pixel rows 62, and sequentially reading out the pixel signals corresponding to the charges accumulated in the photoelectric conversion elements 61A from the pixel rows 62 for which the exposure is ended.

In a case where the driving based on the rolling shutter method is performed, the imaging control unit 11A sets a difference Δt between start timings of the exposure started in each of two adjacent pixel rows 62 to a value other than 1/n of the exposure time that is a time in which the exposure is performed. Here, n is an integer greater than or equal to 1.

The light emission control unit 11B emits the auxiliary light a plurality of times from the light emission device 30 with a predetermined light emission cycle while the driving based on the rolling shutter method is performed under control of the imaging control unit 11A.

Specifically, the light emission control unit 11B controls a light emission cycle of the auxiliary light to be a time that is m times the difference Δt. Here, m is an integer greater than or equal to 1. The light emission control unit 11B sets an upper limit value of m to a value of a quotient obtained by dividing an exposure time of each pixel row 62 by the difference Δt.

Figure 6:
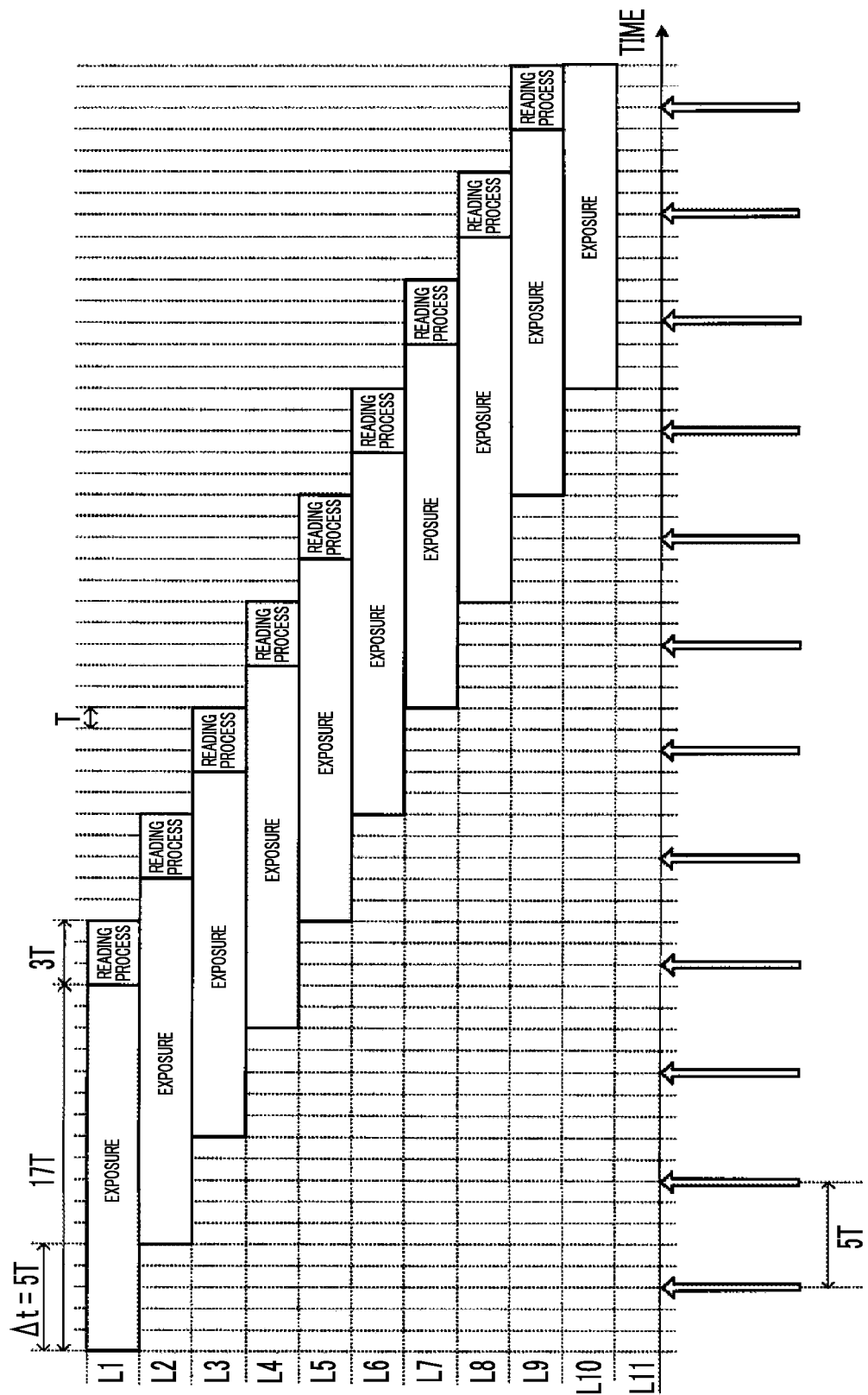
FIG. 6 is a timing chart illustrating a driving example of the imaging sensor 5 at a time of a high speed synchronization mode of the digital camera 100 illustrated in FIG. 1.

FIG. 6 is a timing chart illustrating a driving example of the imaging sensor 5 at the time of the high speed synchronization mode of the digital camera 100 illustrated in FIG. 1.

In FIG. 6, "L1" to "L11" respectively denote the pixel rows 62 that are sequentially arranged on the imaging surface 60 of the imaging sensor 5 from an upper end side toward a lower end side.

In FIG. 6, a block marked with "exposure" next to each pixel row 62 (L1 to L11) indicates the exposure period in which the exposure of each pixel row is performed.

A block marked with "reading process" next to each pixel row 62 (L1 to L11) indicates a period in which the pixel signal is read out from the photoelectric conversion element 61A of each pixel row.

A white arrow illustrated in FIG. 6 indicates a timing at which the auxiliary light is emitted from the light emission device 30. The timing at which the auxiliary light is emitted refers to a timing at which a light emission intensity of the auxiliary light is at a peak.

In the example illustrated in FIG. 6, "T" shown in FIG. 6 denotes a unit time. The exposure time of each pixel row 62 of the imaging sensor 5 is "17T". A time necessary for performing the reading process on each pixel row 62 of the imaging sensor 5 is "3T". The difference Δt between the start timings of the exposure periods in two adjacent pixel rows 62 of the imaging sensor 5 is "5T". In addition, the light emission cycle of the auxiliary light is controlled to be "5T".

The exposure period of each pixel row 62 of the imaging sensor 5 is a value that is determined by an imaging condition such as imaging sensitivity or an exposure value or settings from the user.

The time necessary for performing the reading process on each pixel row 62 of the imaging sensor 5 is a fixed value that is determined by processing performance and the like of the signal processing circuit 64.

The imaging control unit 11A controls the difference Δt between the start timings of the exposure periods of two adjacent pixel rows 62 to be a value other than 1/n of the exposure time of each pixel row 62.

In the example illustrated in FIG. 6, the difference Δt is "5T". The difference Δt is a value other than 1/n of the exposure time (=17T). By determining the difference Δt in such a manner, the exposure of another pixel row 62 is not started during the reading process for the pixel signal from each pixel row 62. Thus, it is possible to prevent a noise caused by resetting the photoelectric conversion element 61A from being mixing into the pixel signal read out from each pixel row 62.

In addition, the example illustrated in FIG. 6 shows an example of m=1, and the light emission cycle of the auxiliary light is controlled to be the difference Δt (=5T).

Figure 7:
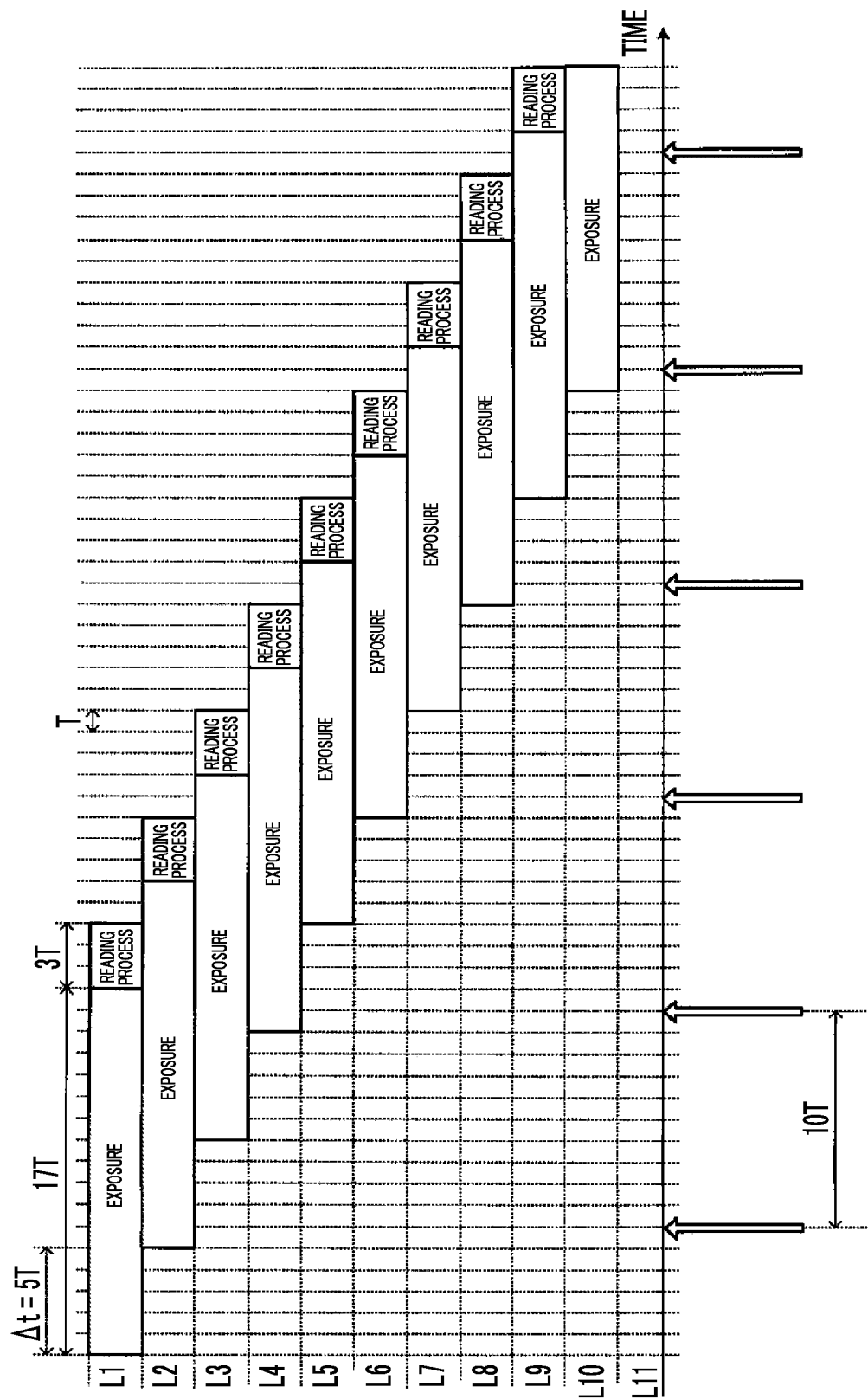
FIG. 7 is a timing chart illustrating a first modification example of the driving example of the imaging sensor 5 at the time of the high speed synchronization mode of the digital camera 100 illustrated in FIG. 1.

FIG. 7 is a timing chart illustrating a first modification example of the driving example of the imaging sensor 5 at the time of the high speed synchronization mode of the digital camera 100 illustrated in FIG. 1.

In the timing chart illustrated in FIG. 7, the light emission timing of the auxiliary light is the only difference with FIG. 6. Specifically, the example illustrated in FIG. 7 shows an example of m=2, and the light emission cycle (=10T) of the auxiliary light is controlled to be double the difference Δt (=5T).

Figure 8:
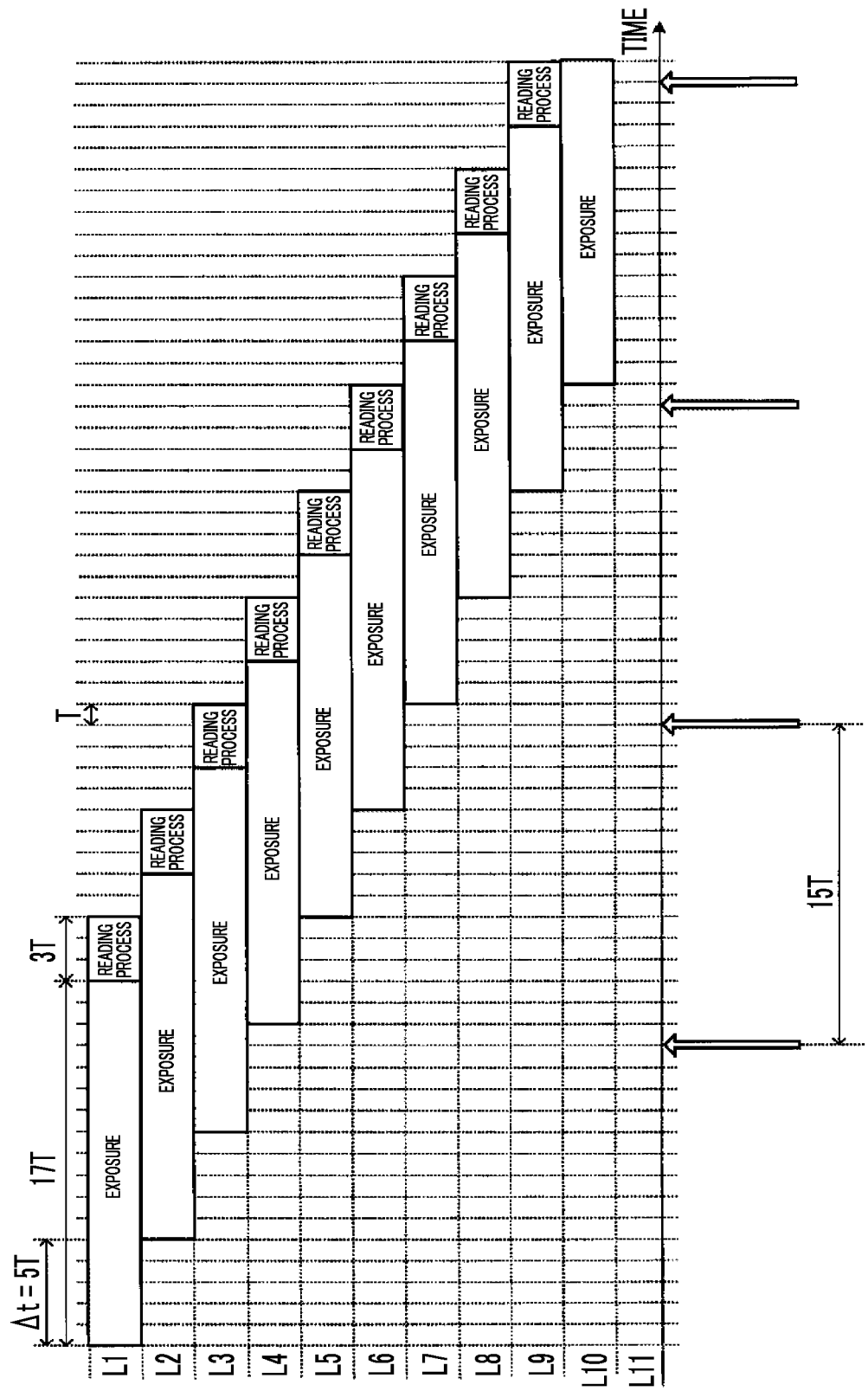
FIG. 8 is a timing chart illustrating a second modification example of the driving example of the imaging sensor 5 at the time of the high speed synchronization mode of the digital camera 100 illustrated in FIG. 1.

FIG. 8 is a timing chart illustrating a second modification example of the driving example of the imaging sensor 5 at the time of the high speed synchronization mode of the digital camera 100 illustrated in FIG. 1.

In the timing chart illustrated in FIG. 8, the light emission timing of the auxiliary light is the only difference with FIG. 6. Specifically, the example illustrated in FIG. 8 shows an example of m=3, and the light emission cycle (=15T) of the auxiliary light is controlled to be three times the difference Δt (=5T).

Figure 9:
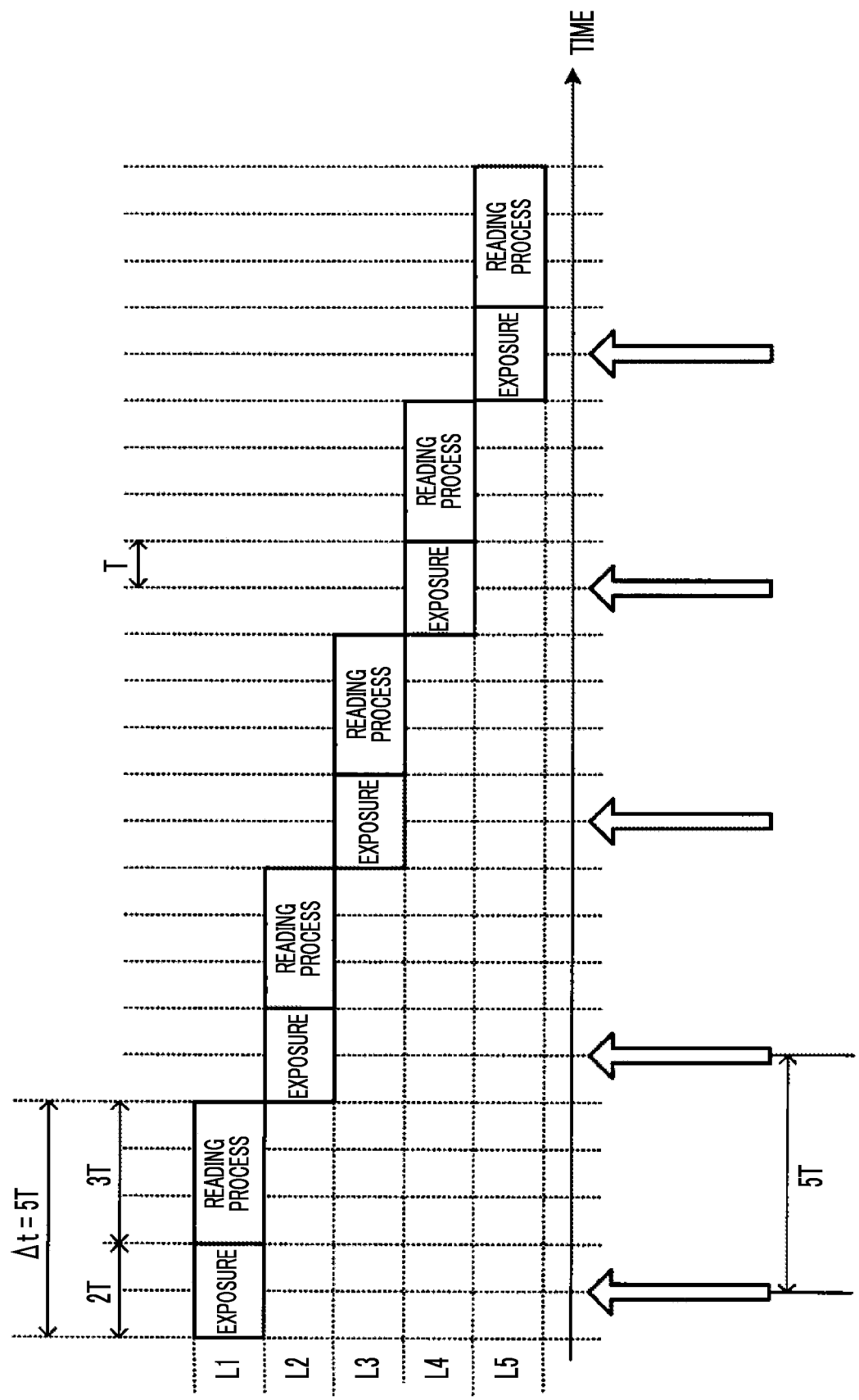
FIG. 9 is a timing chart illustrating a third modification example of the driving example of the imaging sensor 5 at the time of the high speed synchronization mode of the digital camera 100 illustrated in FIG. 1.

FIG. 9 is a timing chart illustrating a third modification example of the driving example of the imaging sensor 5 at the time of the high speed synchronization mode of the digital camera 100 illustrated in FIG. 1.

In FIG. 9, "L1" to "L5" respectively denote the pixel rows 62 that are sequentially arranged on the imaging surface 60 of the imaging sensor 5 from the upper end side toward the lower end side.

In FIG. 9, a block marked with "exposure" next to each pixel row 62 (L1 to L5) indicates the exposure period in which the exposure of each pixel row is performed.

A block marked with "reading process" next to each pixel row 62 (L1 to L5) indicates a period in which the pixel signal is read out from the photoelectric conversion element 61A of each pixel row.

A white arrow illustrated in FIG. 9 indicates a timing at which the auxiliary light is emitted from the light emission device 30. The timing at which the auxiliary light is emitted refers to a timing at which a light emission intensity of the auxiliary light is at a peak.

In the example illustrated in FIG. 9, "T" shown in FIG. 9 denotes a unit time. The exposure time of each pixel row 62 of the imaging sensor 5 is "2T". A time necessary for performing the reading process on each pixel row 62 of the imaging sensor 5 is "3T". The difference $\Delta t$ between the start timings of the exposure periods in two adjacent pixel rows 62 of the imaging sensor 5 is "5T". In addition, the light emission cycle of the auxiliary light is controlled to be "5T".

The example illustrated in FIG. 9 shows an example of m=1, and the light emission cycle (=5T) of the auxiliary light is controlled to be the difference $\Delta t$ (=5T).

As illustrated in FIG. 6 to FIG. 9, by controlling the light emission cycle of the auxiliary light to be m times the difference $\Delta t$, a uniform intensity of the auxiliary light can be received by the pixel row 62 during the exposure period in any pixel row 62.

According to the driving example illustrated in FIG. 6 to FIG. 9, in each pixel row 62, the start or end timing of the exposure period can be prevented from overlapping with the light emission timing of the auxiliary light. Thus, even in a case where jitter occurs in the auxiliary light, occurrence of unevenness in the captured image can be prevented.

In addition, in the example of any of FIG. 6 to FIG. 9, the emitted auxiliary light is received by any pixel row 62, and the auxiliary light can be efficiently used.

In a case where the light emission cycle of the auxiliary light is controlled to be a time greater than or equal to k times the difference $\Delta t$, where k is an integer greater than or equal to 3, the light emission control unit 11B may emit additional auxiliary light (k−2) times as an upper limit with a cycle of the difference $\Delta t$ during the light emission cycle.

Figure 10:
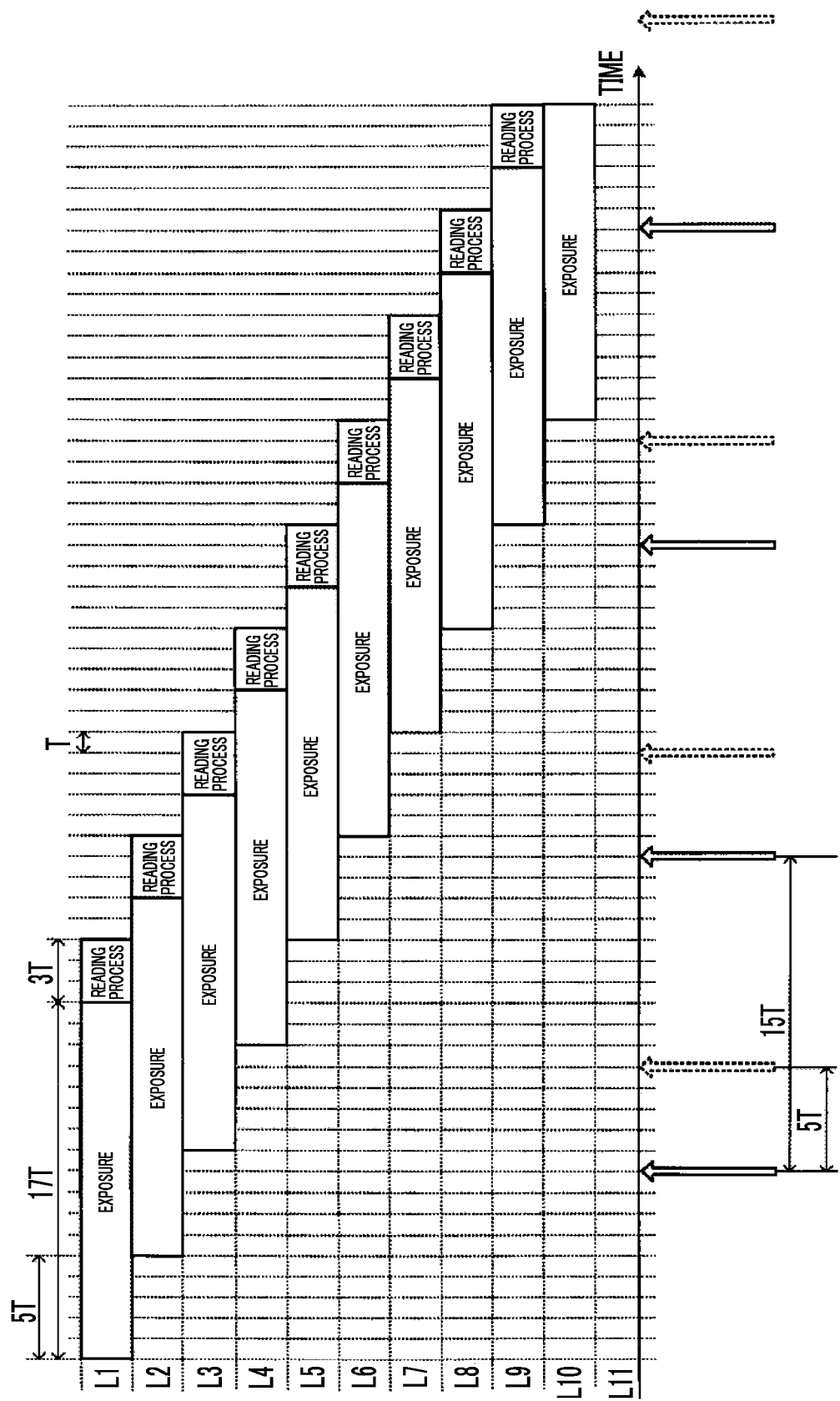
FIG. 10 is a timing chart illustrating a fourth modification example of the driving example of the imaging sensor 5 at the time of the high speed synchronization mode of the digital camera 100 illustrated in FIG. 1.

FIG. 10 is a timing chart illustrating a fourth modification example of the driving example of the imaging sensor 5 at the time of the high speed synchronization mode of the digital camera 100 illustrated in FIG. 1. FIG. 10 is obtained by changing the position of the arrow illustrated by a solid line and adding an arrow illustrated by a dotted line in the timing chart illustrated in FIG. 8.

The example illustrated in FIG. 10 shows an example in which k is "3". The light emission control unit 11B emits the auxiliary light with the light emission cycle (=15T) and emits additional auxiliary light (a dotted line white arrow in FIG. 10) once as an upper limit with the cycle of the difference $\Delta t$ (=5T) from the light emission timing (a solid line white arrow in FIG. 10) of the auxiliary light emitted with the light emission cycle as a starting point.

While the example of k=3 is illustrated, the additional auxiliary light can also be emitted in a case where k is greater than or equal to 4.

Figure 11:
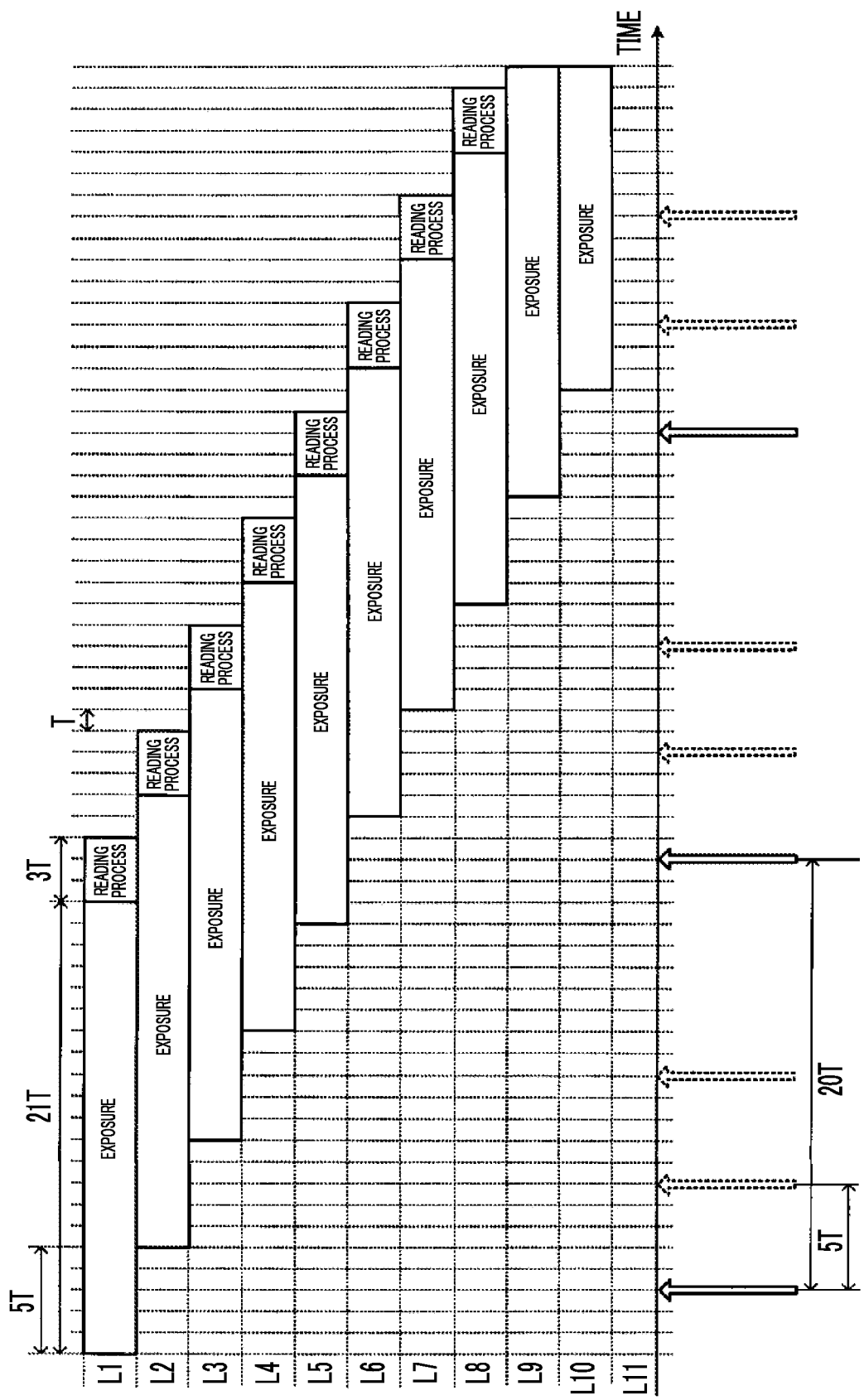
FIG. 11 is a timing chart illustrating a fifth modification example of the driving example of the imaging sensor 5 at the time of the high speed synchronization mode of the digital camera 100 illustrated in FIG. 1.

FIG. 11 is a timing chart illustrating a fifth modification example of the driving example of the imaging sensor 5 at the time of the high speed synchronization mode of the digital camera 100 illustrated in FIG. 1.

In the example illustrated in FIG. 11, "T" shown in FIG. 11 denotes a unit time. The exposure time of each pixel row 62 of the imaging sensor 5 is "21T". A time necessary for performing the reading process on each pixel row 62 of the imaging sensor 5 is "3T". The difference $\Delta t$ between the start timings of the exposure periods in two adjacent pixel rows 62 of the imaging sensor 5 is "5T". In addition, the light emission cycle of the auxiliary light is controlled to be "20T".

In the example illustrated in FIG. 11, k is "4". Thus, additional auxiliary light is emitted (4−2)=2 times as an upper limit with a cycle of $\Delta t$=5T from the light emission timing of the auxiliary light emitted for each "20T".

As illustrated in FIG. 10 and FIG. 11, by emitting the additional auxiliary light during the light emission cycle of m times $\Delta t$, brightness of the auxiliary light emitted with the light emission cycle can be supplemented by the additional auxiliary light, and brightness of the captured image can be sufficiently secured.

In the digital camera 100 illustrated in FIG. 1, it is preferable that the light emission device 30 is fixed to the main body unit 100A. In a case where the light emission device 30 and the main body unit 100A are integrated, the number of light emission devices 30 as a control target of the light emission control unit 11B is limited to one. Thus, light emission control can be easily performed.

In addition, it is preferable that the light emission control unit 11B emits the auxiliary light in a state where overlapping between the light emission period (a period from a time when the light emission intensity of the auxiliary light exceeds a threshold value until a time when the light emission intensity becomes less than the threshold value) of the auxiliary light emitted from the light emission device 30 and the start timing of the exposure period of each pixel row 62 is avoided.

Figure 12:
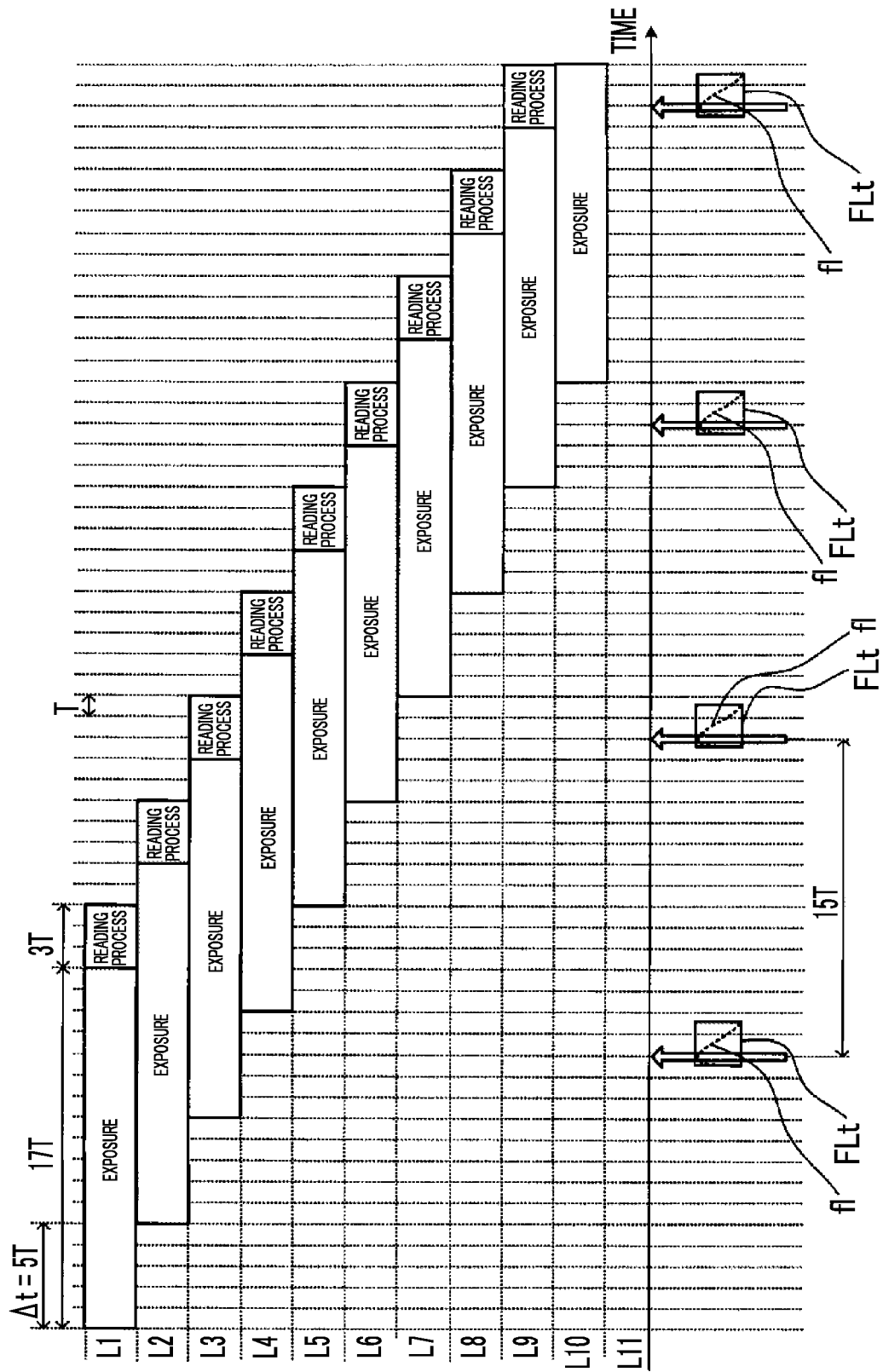
FIG. 12 is a timing chart illustrating a driving example of the imaging sensor 5 at the time of the high speed synchronization mode of the digital camera 100 illustrated in FIG. 1.

FIG. 12 is a timing chart illustrating a driving example of the imaging sensor 5 in a case of difference $\Delta t$="5T", exposure time="17T", time necessary for reading process="3T", and light emission cycle="15T". In FIG. 12, a light emission waveform fl of the auxiliary light and a light emission period FLt that is a period from a rise timing until a fall timing of the light emission waveform fl are illustrated.

In the example illustrated in FIG. 12, each light emission period FLt does not overlap with the start timing of the exposure period of any pixel row 62. By controlling the light emission period in such a manner, jitter tolerance of the auxiliary light can be further improved.

Next, a configuration of a smartphone as the imaging apparatus according to the embodiment of the present invention will be described.

Figure 13:
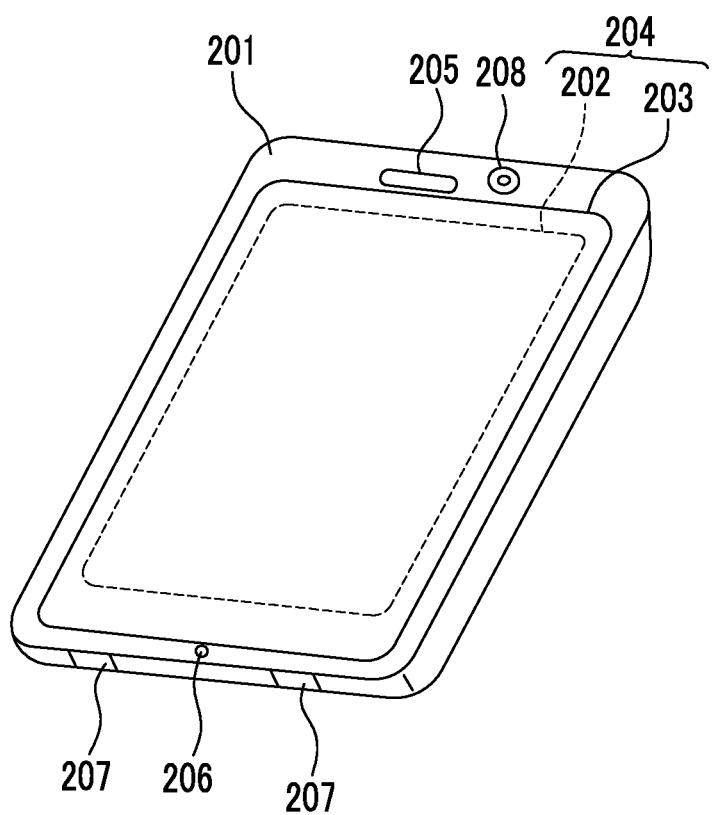
FIG. 13 illustrates an exterior of a smartphone 200 that is the imaging apparatus according to one embodiment of the present invention.

FIG. 13 illustrates an exterior of a smartphone 200 that is the imaging apparatus according to one embodiment of the present invention.

The smartphone 200 illustrated in FIG. 13 includes a casing 201 having a flat plate shape and comprises a display and input unit 204 in which a display panel 202 as a display surface and an operation panel 203 as an input unit are integrated on one surface of the casing 201.

The casing 201 comprises a speaker 205, a microphone 206, an operation unit 207, and a camera unit 208. The configuration of the casing 201 is not for limitation and may employ, for example, a configuration in which the display surface and the input unit are independently disposed, or a configuration that has a folded structure or a sliding mechanism.

Figure 14:
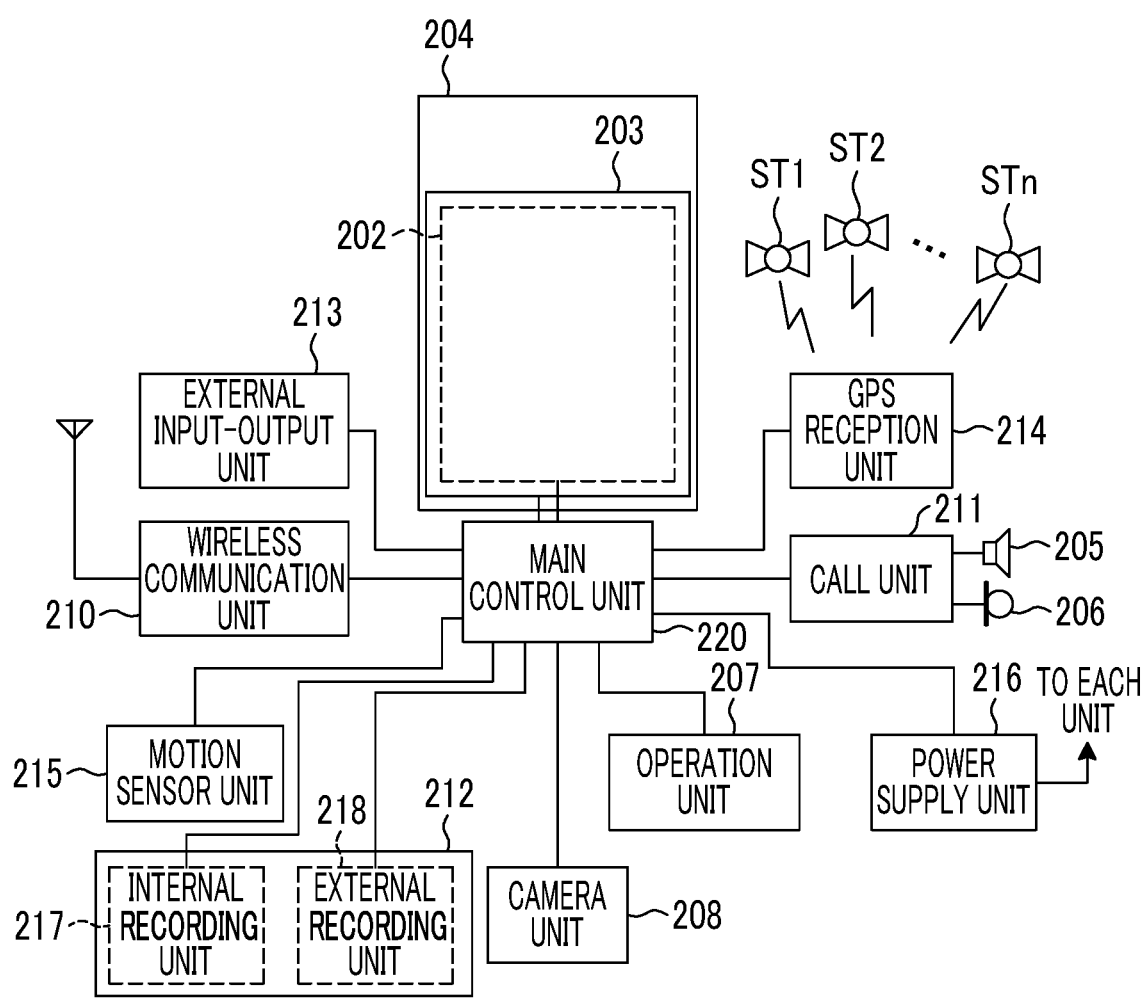
FIG. 14 is a block diagram illustrating a configuration of the smartphone 200 illustrated in FIG. 13.
Figure 15:
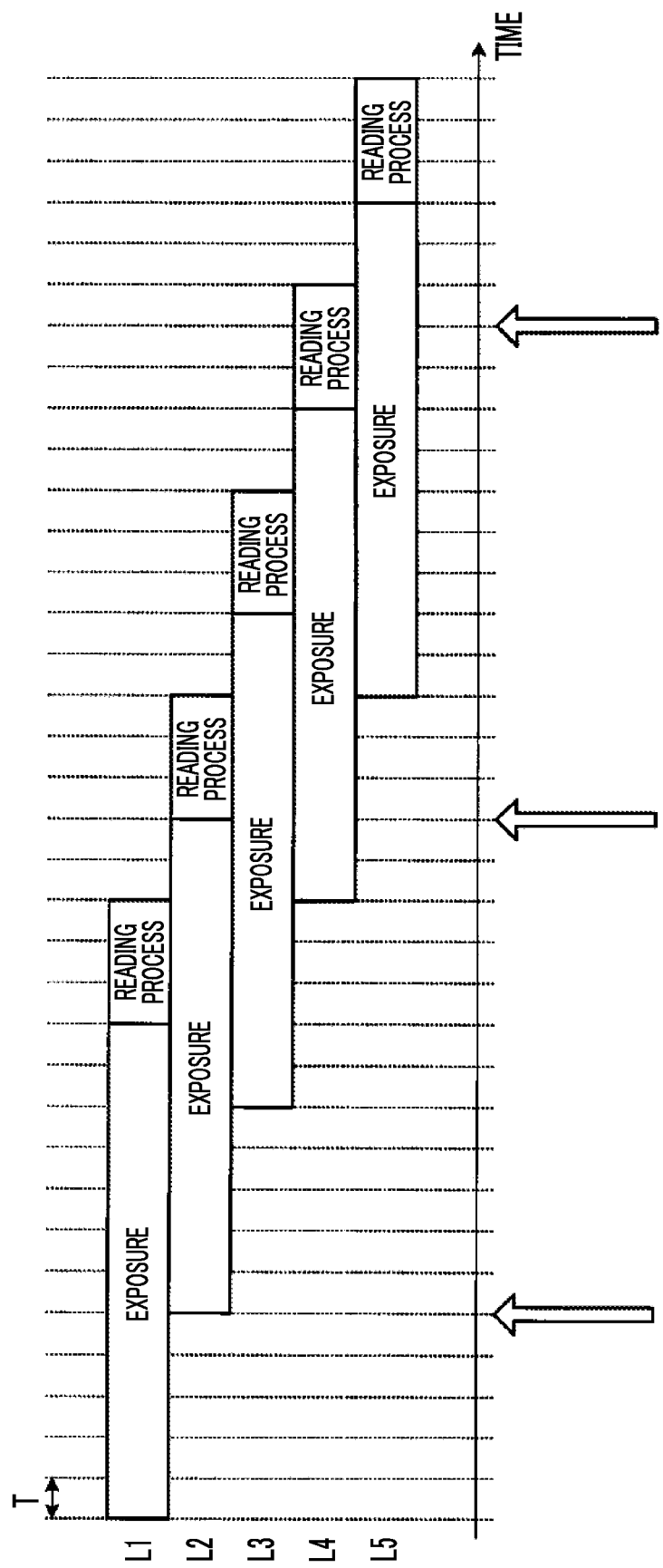
FIG. 15 is a timing chart illustrating one example of driving based on a rolling shutter method.
Figure 16:
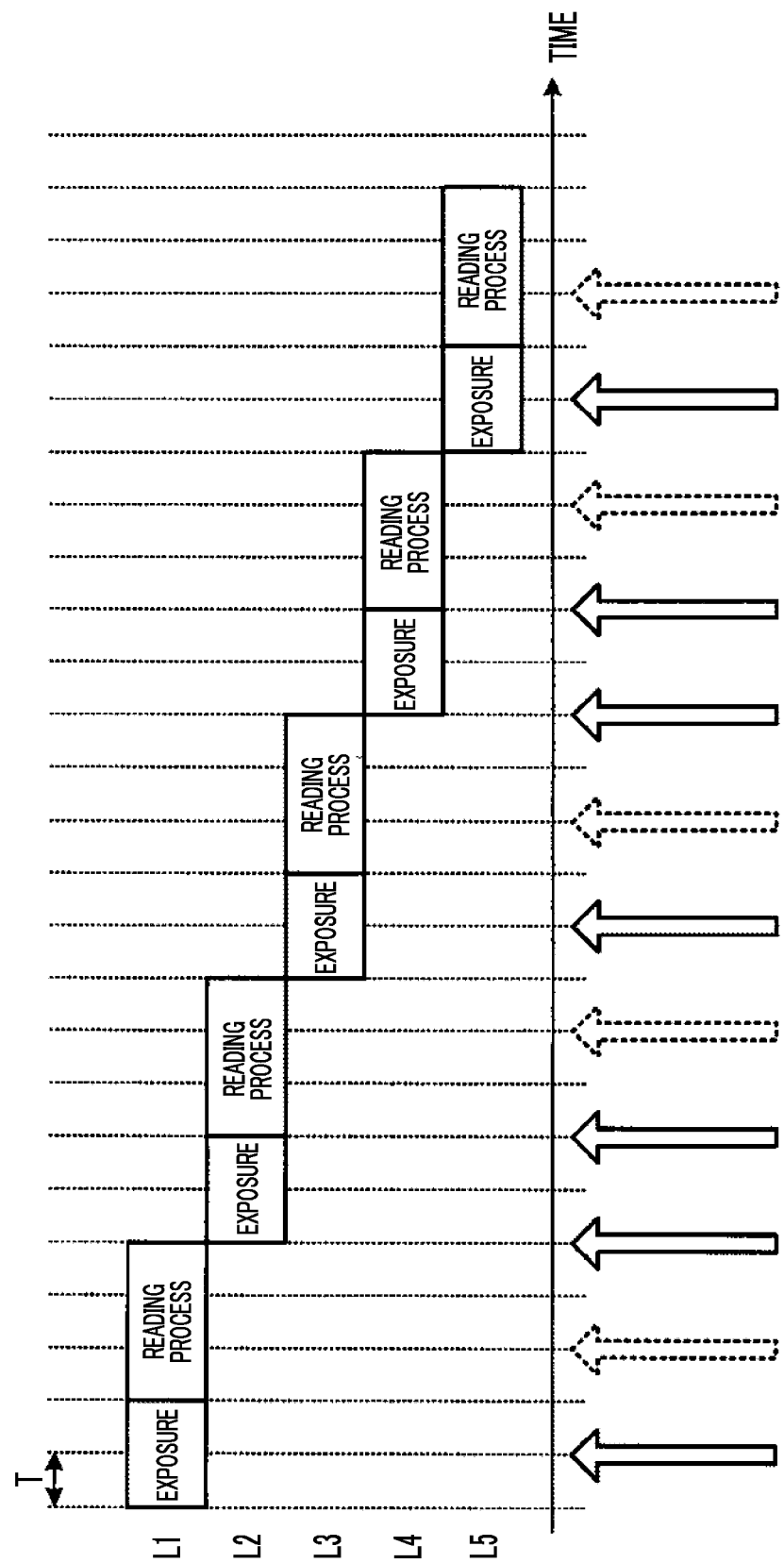
FIG. 16 is a timing chart illustrating one example of the driving based on the rolling shutter method.

FIG. 14 is a block diagram illustrating a configuration of the smartphone 200 illustrated in FIG. 13.

As illustrated in FIG. 14, a wireless communication unit 210, the display and input unit 204, a call unit 211, the operation unit 207, the camera unit 208, a recording unit 212, an external input-output unit 213, a global positioning system (GPS) reception unit 214, a motion sensor unit 215, a power supply unit 216, and a main control unit 220 are comprised as main constituents of the smartphone.

In addition, a wireless communication function of performing mobile wireless communication with a base station apparatus BS, not illustrated, through a mobile communication network NW, not illustrated, is provided as a main function of the smartphone 200.

The wireless communication unit 210 performs wireless communication with the base station apparatus BS accommodated in the mobile communication network NW in accordance with an instruction from the main control unit 220. By using the wireless communication, transmission and reception of various file data such as voice data and image data, electronic mail data, or the like and reception of web data, streaming data, or the like are performed.

The display and input unit 204 is a so-called touch panel that visually delivers information to the user by displaying images (still images and motion images), text information, or the like and detects a user operation with respect to the displayed information under control of the main control unit 220. The display and input unit 204 comprises the display panel 202 and the operation panel 203.

The display panel 202 uses a liquid crystal display (LCD), an organic electro-luminescence display (OELD), or the like as a display device.

The operation panel 203 is a device that is placed such that an image displayed on the display surface of the display panel 202 can be visually recognized, is operated by a finger of the user or a stylus, and detects one or a plurality of coordinates. In a case where the device is operated by the finger of the user or the stylus, a detection signal generated by the operation is output to the main control unit 220. Next, the main control unit 220 detects an operation position (coordinates) on the display panel 202 based on the received detection signal.

As illustrated in FIG. 14, the display panel 202 and the operation panel 203 of the smartphone 200 illustrated as the imaging apparatus according to one embodiment of the present invention are integrated and constitute the display and input unit 204. The operation panel 203 is arranged to completely cover the display panel 202.

In a case where such arrangement is employed, the operation panel 203 may have a function of detecting the user operation even in a region outside the display panel 202. In other words, the operation panel 203 may comprise a detection region (hereinafter, referred to as a display region) for an overlapping part in overlap with the display panel 202 and a detection region (hereinafter, referred to as a non-display region) for an edge part other than the overlapping part that is not in overlap with the display panel 202.

The size of the display region and the size of the display panel 202 may completely match, but both sizes do not need to match. In addition, the operation panel 203 may comprise two sensitive regions of the edge part and an inner part other than the edge part. Furthermore, the width of the edge part is appropriately designed depending on the size and the like of the casing 201.

Furthermore, as a position detection method employed in the operation panel 203, a matrix switch method, a resistive film method, a surface acoustic wave method, an infrared method, an electromagnetic induction method, an electrostatic capacitive method, and the like are exemplified, and any of the methods can be employed.

The call unit 211 comprises the speaker 205 or the microphone 206 and converts voice of the user input through the microphone 206 into voice data processable in the main control unit 220 and outputs the voice data to the main control unit 220, or decodes voice data received by the wireless communication unit 210 or the external input-output unit 213 and outputs the decoded voice data from the speaker 205.

In addition, as illustrated in FIG. 13, for example, the speaker 205 can be mounted on the same surface as a surface on which the display and input unit 204 is disposed, and the microphone 206 can be mounted on a side surface of the casing 201.

The operation unit 207 is a hardware key that uses a key switch or the like, and receives an instruction from the user. For example, as illustrated in FIG. 13, the operation unit 207 is a push-button type switch that is mounted on a side surface of the casing 201 of the smartphone 200 and enters an ON state in a case where the switch is pressed by the finger or the like, and enters an OFF state by restoring force of a spring or the like in a case where the finger is released.

In the recording unit 212, a control program and control data of the main control unit 220, application software, address data in which a name, a telephone number, or the like of a communication counterpart is associated, transmitted and received electronic mail data, web data downloaded by web browsing, and downloaded contents data are recorded, and streaming data or the like is temporarily recorded. In addition, the recording unit 212 is configured with an internal recording unit 217 incorporated in the smartphone and an external recording unit 218 that includes a slot for an attachable and detachable external memory.

Each of the internal recording unit 217 and the external recording unit 218 constituting the recording unit 212 is implemented using a storage medium such as a memory (for example, a MicroSD (registered trademark) memory) of a flash memory type, a hard disk type, a multimedia card micro type, or a card type, a random access memory (RAM), or a read only memory (ROM).

The external input-output unit 213 is an interface with all external apparatuses connected to the smartphone 200 and is directly or indirectly connected to other external apparatuses by communication or the like (for example, Universal Serial Bus (USB) or IEEE1394) or through a network (for example, the Internet, a wireless LAN, Bluetooth (registered trademark), radio frequency identification (RFID), infrared communication (Infrared Data Association (IrDA) (registered trademark)), Ultra Wideband (UWB) (registered trademark), or ZigBee (registered trademark)).

For example, the external apparatuses connected to the smartphone 200 include a wired/wireless headset, a wired/wireless external charger, a wired/wireless data port, a memory card and a subscriber identity module (SIM)/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, and an earphone.

The external input-output unit 213 can deliver data transferred from the external apparatuses to each constituent in the smartphone 200 or transfer data in the smartphone 200 to the external apparatuses.

The GPS reception unit 214 receives GPS signals transmitted from GPS satellites ST1 to STn, executes a position measurement calculation process based on the received plurality of GPS signals, and detects a position that includes a latitude, a longitude, and an altitude of the smartphone 200 in accordance with an instruction from the main control unit 220. When positional information can be acquired from the wireless communication unit 210 or the external input-output unit 213 (for example, a wireless LAN), the GPS reception unit 214 can detect the position using the positional information.

The motion sensor unit 215 comprises, for example, a three-axis acceleration sensor and detects a physical motion of the smartphone 200 in accordance with an instruction from the main control unit 220. By detecting the physical motion of the smartphone 200, a movement direction or an acceleration of the smartphone 200 is detected. The detection result is output to the main control unit 220.

The power supply unit 216 supplies power stored in a battery (not illustrated) to each unit of the smartphone 200 in accordance with an instruction from the main control unit 220.

The main control unit 220 comprises a microprocessor, operates in accordance with the control program and the control data recorded in the recording unit 212, and manages and controls each unit of the smartphone 200. In addition, the main control unit 220 has a mobile communication control function of controlling each unit of a communication system and an application processing function for performing voice communication or data communication through the wireless communication unit 210.

The application processing function is implemented by operating the main control unit 220 in accordance with the application software recorded in the recording unit 212. For example, the application processing function is an infrared communication function of performing data communication with an opposing apparatus by controlling the external input-output unit 213, an electronic mail function of transmitting and receiving electronic mails, or a web browsing function of browsing a web page.

In addition, the main control unit 220 has an image processing function such as displaying a video on the display and input unit 204 based on image data (data of a still image or a motion image) such as reception data or downloaded streaming data.

The image processing function refers to a function of causing the main control unit 220 to decode the image data, perform image processing on the decoding result, and display an image on the display and input unit 204.

Furthermore, the main control unit 220 executes display control for the display panel 202 and operation detection control for detecting the user operation through the operation unit 207 and the operation panel 203.

By executing the display control, the main control unit 220 displays an icon for starting the application software or a software key such as a scroll bar or displays a window for creating an electronic mail.

The scroll bar refers to a software key for receiving an instruction to move a display part of a large image or the like that does not fit in the display region of the display panel 202.

In addition, by executing the operation detection control, the main control unit 220 detects the user operation through the operation unit 207, receives an operation with respect to the icon and an input of a text string in an input field of the window through the operation panel 203, or receives a request for scrolling the display image through the scroll bar.

Furthermore, by executing the operation detection control, the main control unit 220 has a touch panel control function of determining whether the operation position on the operation panel 203 is in the overlapping part (display region) in overlap with the display panel 202 or the other edge part (non-display region) not in overlap with the display panel 202 and controlling the sensitive region of the operation panel 203 or a display position of the software key.

In addition, the main control unit 220 can detect a gesture operation with respect to the operation panel 203 and execute a preset function depending on the detected gesture operation.

The gesture operation is not a simple touch operation in the relate art and means an operation of drawing a trajectory by the finger or the like, designating a plurality of positions at the same time, or drawing a trajectory for at least one of the plurality of positions as a combination thereof.

The camera unit 208 includes configurations other than the external memory control unit 20, the recording medium 21, the display controller 22, the display surface 23, and the operation unit 14 in the digital camera 100 illustrated in FIG. 1.

The captured image data of RAW format or JPEG format generated by the camera unit 208 can be recorded in the recording unit 212 instead of the recording medium 21 or be output through the external input-output unit 213 or the wireless communication unit 210.

In the smartphone 200 illustrated in FIG. 13, the camera unit 208 is mounted on the same surface as the display and input unit 204. However, the mount position of the camera unit 208 is not for limitation purposes. The camera unit 208 may be mounted on a rear surface of the display and input unit 204.

In addition, the camera unit 208 can be used in various functions of the smartphone 200. For example, an image acquired by the camera unit 208 can be displayed on the display panel 202, or the image of the camera unit 208 can be used as one of operation inputs of the operation panel 203.

In addition, in a case where the GPS reception unit 214 detects the position, the position can be detected by referring to the image from the camera unit 208. Furthermore, by referring to the image from the camera unit 208, an optical axis direction of the camera unit 208 of the smartphone 200 can be determined, or the current usage environment can be determined without using the three-axis acceleration sensor or using the three-axis acceleration sensor. The image from the camera unit 208 can also be used in the application software.

Besides, image data of a still image or a motion image to which the positional information acquired by the GPS reception unit 214, voice information (may be text information acquired by performing voice to text conversion by the main control unit or the like) acquired by the microphone 206, attitude information acquired by the motion sensor unit 215, or the like is added can be recorded in the recording unit 212 or be output through the external input-output unit 213 or the wireless communication unit 210.

Even in the smartphone 200 having the above configuration, the brightness unevenness in the captured image in a case where high speed synchronization imaging is performed can be prevented. In addition, the efficiency of the auxiliary light can be increased.

As described thus far, the following matters are disclosed in the present specification.

(1) An imaging control device comprising an imaging control unit that images a subject by performing driving based on a rolling shutter method on an imaging sensor which includes a plurality of pixels each including a photoelectric conversion element and an imaging surface on which a plurality of pixel rows each including a plurality of the pixels arranged in a first direction are arranged in a second direction orthogonal to the first direction, and a light emission control unit that emits auxiliary light a plurality of times from a light emission device of the auxiliary light while the imaging is performed, in which the driving based on the rolling shutter method is driving of sequentially performing a process of starting exposure of the photoelectric conversion elements of the pixel rows by resetting charges of the photoelectric conversion elements of the pixel rows while changing the pixel rows, and sequentially reading out pixel signals corresponding to charges accumulated in the photoelectric conversion elements from the pixel rows for which the exposure is ended, a difference between start timings of the exposure started by the driving in two adjacent pixel rows is a value other than 1/n of an exposure time that is a time in which the exposure is performed, where n is an integer greater than or equal to 1, and the light emission control unit controls a light emission cycle of the auxiliary light to be a time that is m times the difference, where m is an integer greater than or equal to 1.

(2) The imaging control device according to (1), in which in a case where the exposure time is greater than the difference, the light emission control unit sets an upper limit value of m to a value that is a quotient obtained by dividing the exposure time by the difference.

(3) The imaging control device according to (1) or (2), in which in a case where the light emission cycle of the auxiliary light is controlled to be a time greater than or equal to k times the difference, where k is an integer greater than or equal to 3, the light emission control unit emits additional auxiliary light k−2 times as an upper limit with a cycle of the difference from a light emission timing of the auxiliary light as a starting point during the light emission cycle.

(4) The imaging control device according to any one of (1) to (3), in which the light emission control unit emits the auxiliary light in a state where overlapping between a light emission period of the auxiliary light and a timing at which the exposure of the pixel rows is started is avoided.

(5) An imaging apparatus comprising the imaging control device according to any one of (1) to (4), and the imaging sensor.

(6) The imaging apparatus according to (5), further comprising the light emission device.

(7) An imaging control method comprising an imaging control step of imaging a subject by performing driving based on a rolling shutter method on an imaging sensor which includes a plurality of pixels each including a photoelectric conversion element and an imaging surface on which a plurality of pixel rows each including a plurality of the pixels arranged in a first direction are arranged in a second direction orthogonal to the first direction, and a light emission control step of emitting auxiliary light a plurality of times from a light emission device of the auxiliary light while the imaging is performed, in which the driving based on the rolling shutter method is driving of sequentially performing a process of starting exposure of the photoelectric conversion elements of the pixel rows by resetting charges of the photoelectric conversion elements of the pixel rows while changing the pixel rows, and sequentially reading out pixel signals corresponding to charges accumulated in the photoelectric conversion elements from the pixel rows for which the exposure is ended, a difference between start timings of the exposure started by the driving in two adjacent pixel rows is a value other than 1/n of an exposure time that is a time in which the exposure is performed, where n is an integer greater than or equal to 1, and in the light emission control step, a light emission cycle of the auxiliary light is controlled to be a time that is m times the difference, where m is an integer greater than or equal to 1.

(8) The imaging control method according to (7), in which in the light emission control step, in a case where the exposure time is greater than the difference, an upper limit value of m is set to a value that is a quotient obtained by dividing the exposure time by the difference.

(9) The imaging control method according to (7) or (8), in which in the light emission control step, in a case where the light emission cycle of the auxiliary light is controlled to be a time greater than or equal to k times the difference, where k is an integer greater than or equal to 3, additional auxiliary light is emitted k−2 times as an upper limit with a cycle of the difference from a light emission timing of the auxiliary light as a starting point during the light emission cycle.

(10) The imaging control method according to any one of (7) to (9), in which in the light emission control step, the auxiliary light is emitted in a state where overlapping between a light emission period of the auxiliary light and a timing at which the exposure of the pixel rows is started is avoided.

(11) An imaging control program causing a computer to execute an imaging control step of imaging a subject by performing driving based on a rolling shutter method on an imaging sensor which includes a plurality of pixels each including a photoelectric conversion element and an imaging surface on which a plurality of pixel rows each including a plurality of the pixels arranged in a first direction are arranged in a second direction orthogonal to the first direction, and a light emission control step of emitting auxiliary light a plurality of times from a light emission device of the auxiliary light while the imaging is performed, in which the driving based on the rolling shutter method is driving of sequentially performing a process of starting exposure of the photoelectric conversion elements of the pixel rows by resetting charges of the photoelectric conversion elements of the pixel rows while changing the pixel rows, and sequentially reading out pixel signals corresponding to charges accumulated in the photoelectric conversion elements from the pixel rows for which the exposure is ended, a difference between start timings of the exposure started by the driving in two adjacent pixel rows is a value other than 1/n of an exposure time that is a time in which the exposure is performed, where n is an integer greater than or equal to 1, and in the light emission control step, a light emission cycle of the auxiliary light is controlled to be a time that is m times the difference, where m is an integer greater than or equal to 1.

According to the present invention, an imaging control device, an imaging apparatus, an imaging control method, and an imaging control program capable of preventing occurrence of brightness unevenness in a captured image and a decrease in efficiency of auxiliary light can be provided.

EXPLANATION OF REFERENCES

100: digital camera
100A: main body unit
1: imaging lens
2: stop
4: lens control unit
5: imaging sensor
60: imaging surface
61: pixel
61A: photoelectric conversion element
61D: floating diffusion
61E: reading circuit
62: pixel row 63: drive circuit
64: signal processing circuit
65: signal line
70: N-type substrate
71: P-well layer
72: reading electrode
73: N-type impurity layer
74: P-type impurity layer
75: region
77: reset transistor
78: output transistor
79: selection transistor
8: lens drive unit
9: stop drive unit
10: imaging sensor drive unit
11: system control unit
11A: imaging control unit
11B: light emission control unit
14: operation unit
15: memory control unit
16: memory
17: digital signal processing unit
20: external memory control unit
21: recording medium
22: display controller
23: display surface
24: control bus
25: data bus
30: light emission device
40: lens device
200: smartphone
201: casing
202: display panel
203: operation panel
204: display and input unit
205: speaker
206: microphone
207: operation unit
208: camera unit
210: wireless communication unit
211: call unit
212: recording unit
213: external input-output unit
214: GPS reception unit
215: motion sensor unit
216: power supply unit
217: internal recording unit
218: external recording unit
220: main control unit
ST1 to STn: GPS satellite

What is claimed is:

1. An imaging control device comprising:
a processor configured to:
image a subject by performing driving based on a rolling shutter method on an imaging sensor which includes a plurality of pixels each including a photodiode and an imaging surface on which a plurality of pixel rows each including a plurality of the pixels arranged in a first direction are arranged in a second direction orthogonal to the first direction; and
cause to emit auxiliary light a plurality of times from a light emission device of the auxiliary light while the imaging is performed,
wherein the driving based on the rolling shutter method is driving of sequentially performing a process of starting exposure of the photodiodes of the pixel rows by resetting charges of the photodiodes of the pixel rows while changing the pixel rows, and sequentially reading out pixel signals corresponding to charges accumulated in the photodiodes from the pixel rows for which the exposure is ended,
a difference between start timings of the exposure started by the driving in two adjacent pixel rows is a value other than 1/n of an exposure time that is a time in which the exposure is performed, where n is an integer greater than or equal to 1, and
the processor controls a light emission cycle of the auxiliary light to be a time that is m times the difference, where m is an integer greater than or equal to 1.

2. The imaging control device according to claim 1, wherein in a case where the exposure time is greater than the difference, the processor sets an upper limit value of m to a value that is a quotient obtained by dividing the exposure time by the difference.

3. The imaging control device according to claim 2, wherein in a case where the light emission cycle of the auxiliary light is controlled to be a time greater than or equal to k times the difference, where k is an integer greater than or equal to 3, the processor cause to emit additional auxiliary light k−2 times as an upper limit with a cycle of the difference from a light emission timing of the auxiliary light as a starting point during the light emission cycle.

4. The imaging control device according to claim 2, wherein the processor cause to emit the auxiliary light in a state where overlapping between a light emission period of the auxiliary light and a timing at which the exposure of the pixel rows is started is avoided.

5. An imaging apparatus comprising:
the imaging control device according to claim 2; and
the imaging sensor.

6. The imaging control device according to claim 1, wherein in a case where the light emission cycle of the auxiliary light is controlled to be a time greater than or equal to k times the difference, where k is an integer greater than or equal to 3, the processor cause to emit additional auxiliary light k−2 times as an upper limit with a cycle of the difference from a light emission timing of the auxiliary light as a starting point during the light emission cycle.

7. The imaging control device according to claim 6, wherein the processor cause to emit the auxiliary light in a state where overlapping between a light emission period of the auxiliary light and a timing at which the exposure of the pixel rows is started is avoided.

8. An imaging apparatus comprising:
the imaging control device according to claim 6; and
the imaging sensor.

9. The imaging control device according to claim 1, wherein the processor cause to emit the auxiliary light in a state where overlapping between a light emission period of the auxiliary light and a timing at which the exposure of the pixel rows is started is avoided.

10. An imaging apparatus comprising:
the imaging control device according to claim 9; and
the imaging sensor.

11. An imaging apparatus comprising:
the imaging control device according to claim 1; and
the imaging sensor.

12. The imaging apparatus according to claim 11, further comprising:
the light emission device.

13. An imaging control method comprising:
an imaging control step of imaging a subject by performing driving based on a rolling shutter method on an imaging sensor which includes a plurality of pixels each including a photodiode and an imaging surface on which a plurality of pixel rows each including a plurality of the pixels arranged in a first direction are arranged in a second direction orthogonal to the first direction; and
a light emission control step of emitting auxiliary light a plurality of times from a light emission device of the auxiliary light while the imaging is performed,
wherein the driving based on the rolling shutter method is driving of sequentially performing a process of starting exposure of the photodiodes of the pixel rows by resetting charges of the photodiodes of the pixel rows while changing the pixel rows, and sequentially reading out pixel signals corresponding to charges accumulated in the photodiodes from the pixel rows for which the exposure is ended,
a difference between start timings of the exposure started by the driving in two adjacent pixel rows is a value other than 1/n of an exposure time that is a time in which the exposure is performed, where n is an integer greater than or equal to 1, and
in the light emission control step, a light emission cycle of the auxiliary light is controlled to be a time that is m times the difference, where m is an integer greater than or equal to 1.

14. The imaging control method according to claim 13, wherein in the light emission control step, in a case where the exposure time is greater than the difference, an upper limit value of m is set to a value that is a quotient obtained by dividing the exposure time by the difference.

15. The imaging control method according to claim 14, wherein in the light emission control step, in a case where the light emission cycle of the auxiliary light is controlled to be a time greater than or equal to k times the difference, where k is an integer greater than or equal to 3, additional auxiliary light is emitted k−2 times as an upper limit with a cycle of the difference from a light emission timing of the auxiliary light as a starting point during the light emission cycle.

16. The imaging control method according to claim 14, wherein in the light emission control step, the auxiliary light is emitted in a state where overlapping between a light emission period of the auxiliary light and a timing at which the exposure of the pixel rows is started is avoided.

17. The imaging control method according to claim 13, wherein in the light emission control step, in a case where the light emission cycle of the auxiliary light is controlled to be a time greater than or equal to k times the difference, where k is an integer greater than or equal to 3, additional auxiliary light is emitted k−2 times as an upper limit with a cycle of the difference from a light emission timing of the auxiliary light as a starting point during the light emission cycle.

18. The imaging control method according to claim 17, wherein in the light emission control step, the auxiliary light is emitted in a state where overlapping between a light emission period of the auxiliary light and a timing at which the exposure of the pixel rows is started is avoided.

19. The imaging control method according to claim 13, wherein in the light emission control step, the auxiliary light is emitted in a state where overlapping between a light emission period of the auxiliary light and a timing at which the exposure of the pixel rows is started is avoided.

20. A non-transitory computer readable recording medium storing a imaging control program causing a computer to execute:
an imaging control step of imaging a subject by performing driving based on a rolling shutter method on an imaging sensor which includes a plurality of pixels each including a photodiode and an imaging surface on which a plurality of pixel rows each including a plurality of the pixels arranged in a first direction are arranged in a second direction orthogonal to the first direction; and
a light emission control step of emitting auxiliary light a plurality of times from a light emission device of the auxiliary light while the imaging is performed,
wherein the driving based on the rolling shutter method is driving of sequentially performing a process of starting exposure of the photodiodes of the pixel rows by resetting charges of the photodiodes of the pixel rows while changing the pixel rows, and sequentially reading out pixel signals corresponding to charges accumulated in the photodiodes from the pixel rows for which the exposure is ended,
a difference between start timings of the exposure started by the driving in two adjacent pixel rows is a value other than 1/n of an exposure time that is a time in which the exposure is performed, where n is an integer greater than or equal to 1, and
in the light emission control step, a light emission cycle of the auxiliary light is controlled to be a time that is m times the difference, where m is an integer greater than or equal to 1.

* * * * *